March 6, 1951 F. X. REES 2,543,869

CENTRALIZED TRAFFIC CONTROLLING SYSTEM

Filed Nov. 12, 1947 7 Sheets-Sheet 1

Inventor

F. X. Rees

By Neil D. Preston, his Attorney

March 6, 1951 F. X. REES 2,543,869

CENTRALIZED TRAFFIC CONTROLLING SYSTEM

Filed Nov. 12, 1947 7 Sheets-Sheet 2

Inventor

F. X. Rees,

By

Neil W. Preston, his Attorney

Inventor
F. X. Rees,
By
Neil W. Preston,
his Attorney

CENTRALIZED TRAFFIC CONTROLLING SYSTEM

Filed Nov. 12, 1947 7 Sheets-Sheet 4

Inventor

F. X. Rees,

By Neil D. Preston, his Attorney

March 6, 1951 F. X. REES 2,543,869

CENTRALIZED TRAFFIC CONTROLLING SYSTEM

Filed Nov. 12, 1947 7 Sheets-Sheet 5

INTERMEDIATE FIELD STATION NO. 3.

Inventor
F. X. Rees,
By Neil D. Preston,
his Attorney

CENTRALIZED TRAFFIC CONTROLLING SYSTEM

Filed Nov. 12, 1947 7 Sheets-Sheet 6

Inventor

F. X. Rees,

By Neil W. Preston, his Attorney

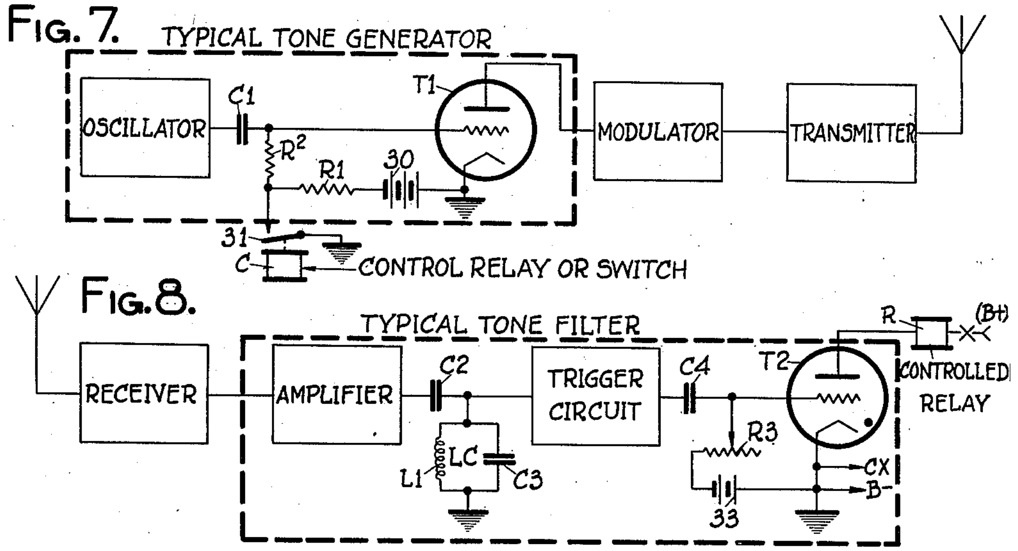
FIG. 7, FIG. 8

FIG. 9.

TONES MODULATING CARRIER F1 FOR CONTROLS

| TONE NO. | USE |
|---|---|
| 1 | RECHECK OF INDICATIONS |
| 2 | CALL STATION NO.2. |
| 3 | CALL STATION NO.3. |
| 4 | SWITCH NORMAL |
| 5 | SWITCH REVERSE |
| 6 | SIGNAL RIGHT |
| 7 | SIGNAL LEFT |
| 8 | SIGNAL STOP |
| 9 | MAINTAINERS CALL |

FIG. 10.

TONES MODULATING CARRIER F2 FOR INDICATIONS

| TONE NO. | USE |
|---|---|
| 1 | CALL CONTROL OFFICE FROM STATION NO.2. |
| 2 | STATION NO.2. REGISTRATION - CALL FROM STATION NO.3. |
| 3 | STATION NO.3. REGISTRATION - CALL FROM STATION NO.4. |
| 4 | STATION NO.4. REGISTRATION |
| 5-6-7 | SIGNAL CLEAR LEFT. |
| 5-6-8 | SIGNAL CLEAR RIGHT |
| 5-6-9 | SIGNAL STOP |
| 5-7-8 | SWITCH LOCKED |
| 5-7-9 | SWITCH UNLOCKED |
| 6-7-8 | TRACK UNOCCUPIED |
| 6-7-9 | TRACK OCCUPIED |

Inventor

F. X. Rees,

By Neil D. Preston, his Attorney

Patented Mar. 6, 1951

2,543,869

UNITED STATES PATENT OFFICE 2,543,869

CENTRALIZED TRAFFIC CONTROLLING SYSTEM

Frank X. Rees, Chili, N. Y., assignor to General Railway Signal Company, Rochester, N. Y.

Application November 12, 1947, Serial No. 785,327

8 Claims. (Cl. 177—353)

This invention relates to centralized traffic control systems for railroads, and it more particularly pertains to centralized traffic control systems in which communication between a control office and the respective field stations is maintained by transmission of distinctive frequency currents or tones.

Problems relative to interference between a plurality of transmitters in the communication part of a centralized traffic control system, conveniently called a CTC system, are solved in some instances by providing different communication channels for the respective control office and field station transmitters, and in other instances by various lock-out organizations wherein only one station is allowed to transmit at a time.

An object of the present invention is to solve the problem of lock-out between indication station transmitters by use of a link transmission organization wherein the indications are relayed from station to station, and no station can transmit its indications by the distinctive modulation of an indication pulse until it receives a so called permission pulse from the most distant station, such pulse being characterized by having only a station call tone applied thereto. In this way a system of superiority is set up wherein the next distant station is always superior with respect to the transmission of indications.

Another object of the present invention is to transmit pulses continuously at a predetermined rate at the most distant field station and to relay such pulses by link communication through the respective field stations whereby the pulses can be selectively modulated by any field station as a means for communicating indications from that field station to the control office provided that there have been no indication modulations applied to a corresponding pulse by a more distant station.

Another object of the present invention is to transmit but one indication per pulse from any field station, such indication being identified because of a distinctive combination of a plurality of tones modulating the pulse simultaneously.

Another object relative to the communication of indications is to transmit from the respective field stations only indications of new changes in the positions of devices as compared to the retransmission of old indications that have been transmitted before. Thus a complete check of all of the indications at a field station is not ordinarily transmitted each time there is a change in a device to be indicated, but it is provided that a complete recheck of indications can be effected in response to the transmission of a recheck control from the control office for that particular field station. Under such recheck conditions, indications of all devices are transmitted from that field station by successive pulses, one indication per pulse.

Another object of the present invention is to accomplish the above objects by radio link communication from the most distant indication station through intermediate indication stations to the control office.

Another object with respect to the radio communication of indications is to communicate indications by radio from respective field stations to the control office on a single assigned carrier frequency for all indication station transmitters, all without interference due to a radio receiver hearing a plurality of transmitters at the same time. This is accomplished by suppressing reception at a field station during transmission by all field stations within transmitting range that are closer to the control office.

Another object of the present invention is to communicate controls from the control office to field stations for the control of switches and signals and the like by distinctive modulations applied to a carrier wave or to a line circuit in accordance with the requirements of practice, the modulations of the carrier wave or line circuit being normally ineffective but being rendered effective in response to manual designation of a particular field station to which controls are to be transmitted.

Certain features herein disclosed which relate to the transmission of indications from stations where a plurality of devices are located requiring the transmission of indications, are disclosed and claimed in the divisional application Ser. No. 179,443, filed August 15, 1950.

Other objects, purposes, and characteristic features of the present invention will be in part obvious from the accompanying drawings, and in part pointed out as the description progresses.

In describing the invention in detail reference is made to the accompanying drawings in which similar letter reference characters are used to designate similar parts of the organization, such parts being generally made distinctive as to the respective field stations with which they are associated by use of preceding numerals or by the use of exponents characteristic of the respective field stations; and in which:

Fig. 7 illustrates a typical tone generator such as is used for the modulation of transmitted carrier wave pulses;

Fig. 8 illustrates a typical tone filter used in the demodulation of pulses that are received at the respective field stations and at the control office;

Fig. 9 is a tabulation showing the manner in which distinctive tones are employed for the communication of controls in this embodiment of the present invention; and, Fig. 10 illustrates the manner in which distinctive tones are assigned for use in communication of respective indications from the various field stations to the control office.

For the purpose of facilitating the disclosure of the present invention as to its mode of operation, schematic wiring diagrams have been used to illustrate the circuit organization rather than attempting to show the specific structure and arrangement of parts that would be employed in practice. Rather than to show wiring connections to all sources of energy, the symbols (+) and (−) have been used to indicate connections to the respective positive and negative terminals of suitable batteries, or other sources of direct current; the symbols B+ and B− have been used to indicate connections to the respective positive and negative terminals of a suitable plate or "B" power supply the terminal B− being connected to ground; and the symbols BX and CX have been used to indicate connections to the respective terminals of a suitable alternating current power supply.

*Control communication apparatus*

Figure 1:
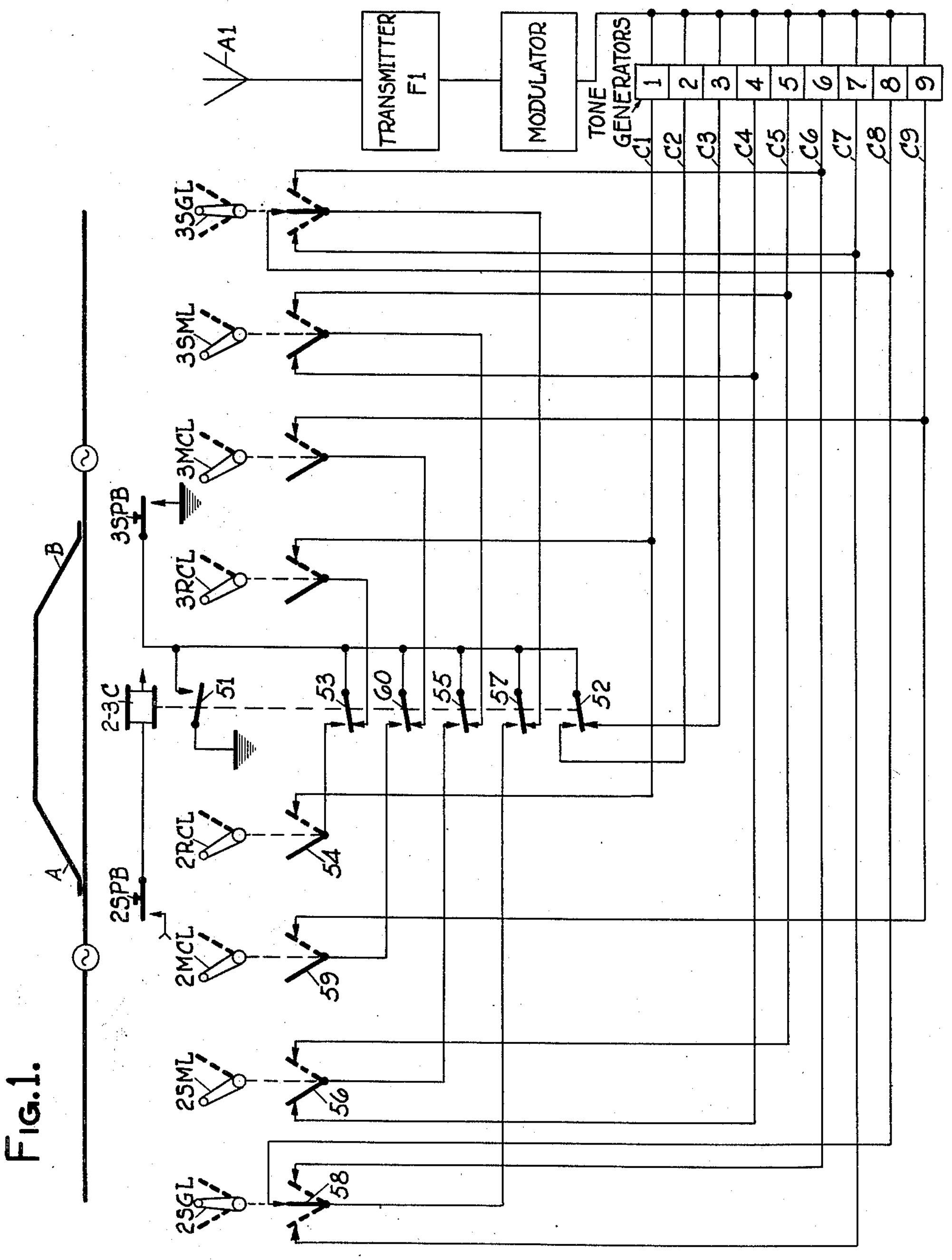
Fig. 1 illustrates control office apparatus for the transmission of control pulses.

With reference to Fig. 1, control office apparatus for the transmission of controls is illustrated wherein a miniature diagram of the track layout for which the CTC system is provided is generally constructed on a control panel and suitable indicator lamps are associated with respective portions of the track diagram to indicate occupancy by trains of respective portions of the trackway, and for other purposes well known to those skilled in the art.

Suitable levers, or switches, are provided on the control panel at the control office for designation of the respective controls to be transmitted to the field stations for governing track switches and signals, maintainers call signals, and indication recheck controls according to the requirements of practice. It is thus illustrated that the signal control lever 2SGL is provided on the panel of the control machine at the control office for governing the signals at field station No. 2 which is located at the A end of the passing siding of this embodiment of the present invention, and the lever 2SML is provided for governing the operation of the track switch 2SW at the same field station. The levers 2MCL and 2RCL are used in governing the transmission of control codes for respective maintainers call and recheck purposes. The control levers 3SGL, 3SML, 3MCL and 3RCL are associated with the designation of controls for communication to field station No. 3 for governing the signals, track switch, maintainers call signal and recheck controls at that station.

In accordance with the usual practice in designating controls for communication to respective field stations in a CTC system, a start button SPB is provided on the panel of the control machine for each field station for rendering effective the transmission of controls to that field station as selected by the above mentioned control levers.

In accordance with the initiation of the transmission of controls for field station No. 2 by the actuation of the start button 2SPB, a relay 2—3C is picked up, and the picking up of that relay causes the respective inputs of a plurality of tone generators to be governed in accordance with selections of the control levers associated with the communication of controls to field station No. 2.

It is thus provided that in response to the initiation of the transmission of a control pulse by the actuation of a button SPB, certain of the tone generators are rendered effective to apply their outputs simultaneously to a modulator, and the output of the modulator is applied to a CW transmitter F1 for the modulation of the carrier wave of that transmitter, the duration of the modulation being governed by the length of the time that the push button SPB is depressed. The output of the CW transmitter F1 is supplied to the antenna A1 for radiation to the respective field station Nos. 2 and 3 as illustrated in Fig. 2, which are both assumed to be within range of the control office transmitter.

Figure 2:
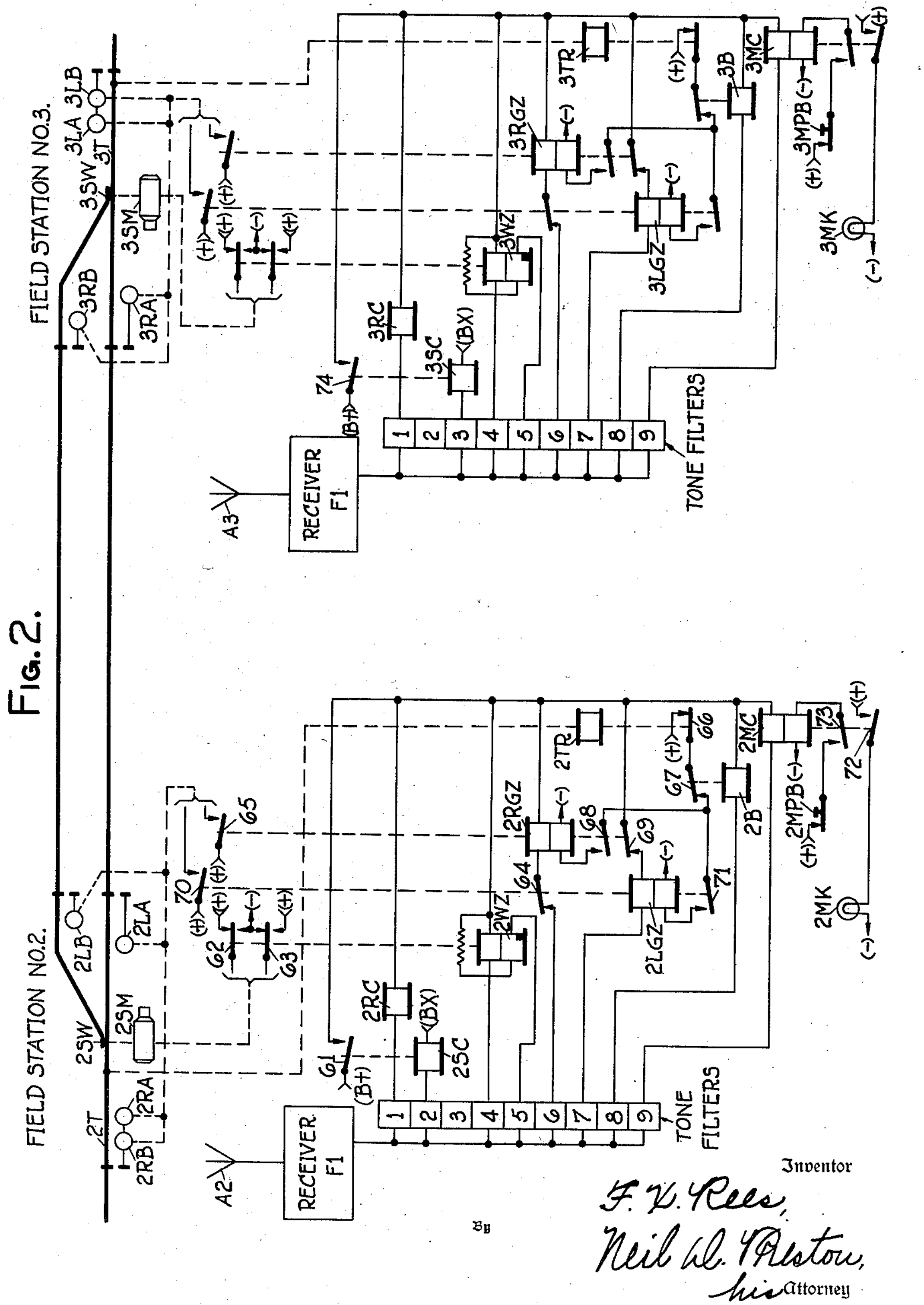
Fig. 2 illustrates the manner in which track switches and signals at respective field stations are controlled in accordance with control pulses received from the control office.

With reference to Fig. 2, a track layout is illustrated having a passing siding and having field station No. 2 at one end of the siding and field station No. 3 at the other end. The passing siding is connected to the main track at the left-hand end by the track switch 2SW, and at the right-hand end by the track switch 3SW. The switch machines 2SM and 3SM provide for the power operation of the track switches 2SW and 3SW respectively in accordance with switch controls communicated from the control office by the CTC system.

The signals 2RA and 2RB are provided for governing traffic to the right through the track switch 2SW, and the signals 2LA and 2LB are provided for governing traffic to the left through the track switch 2SW. Similarly the signals 3LA and 3LB are provided for governing traffic to the left through the track switch 3SW and the signals 3RA and 3RB are provided for governing traffic to the right through the track switch 3SW. The signals are illustrated as being of the search light type such as is shown for example in the patent to O. S. Field No. 2,239,316, dated April 22, 1941, but it is to be understood that other types of signals such as semaphore, position light, or light signals having individual color light units can be as well employed in accordance with the requirements of practice.

Each of the field stations is provided with a receiver F1 and such receiver is tuned to the frequency F1 which is transmitted from the control office. The demodulated output to each of the receivers is connected as illustrated to a bank of tone filters, the bank of tone filters at each field station comprising filters tuned to respective different frequencies. Each filter includes amplifier, trigger circuit, and control tube stages as is shown by the typical tone filter illustrated in Fig. 8. It is to be understood that a larger or smaller number of tone filters is to be provided as required in practice in accordance with the number of field stations included in the CTC system, and the number of distinctive controls to be communicated to each field station.

A station relay SC is provided at each field station for governing the response of the switch and signal control communication apparatus at that field station. Such relay SC is responsive to the output of a particular tone filter corresponding to the station call tone for that field station.

A switch control relay WZ is provided at each of the field stations for governing the operation of the track switch SW at that field station. According to Fig. 2 the switch control relay WZ at each field station is of the magnetic stick type so as to maintain its last operated position, and it is governed by the output of the tone filter Nos. 4 and 5, subject of course to the energization of the station relay SC at that field station.

The relays RGZ and LGZ and B at each of the field stations are associated with the control of the signals at that station, the relay RGZ being associated with the clearing of signals governing traffic to the right, and the relay LGZ being associated with the clearing of signals governing traffic to the left. The relay B is associated with the restoration to stop of the signals at its associated field station in accordance with a stop control communicated from the control office, and the OS track relay TR at each field station is effective to automatically restore the signals to stop upon the passage of a train. The relays RGZ, LGZ and B are governed by the output of tone filters Nos. 6, 7 and 8 respectively.

The output of the tone filter No. 9 is used in the control of a maintainer's call relay MC at each of the field stations, and such relay MC governs suitable indication means such as an indicator lamp MK which can be extinguished when the maintainer's call is acknowledged by the actuation of a suitable cancel button or switch MPB.

A relay RC is associated with the output of tone filter No. 1 at each of the field stations for the purpose of initiating the transmission of a recheck of all indications at the associated field station in accordance with a distinctive control transmitted from the control office.

*Indication communication apparatus*

Figure 6:
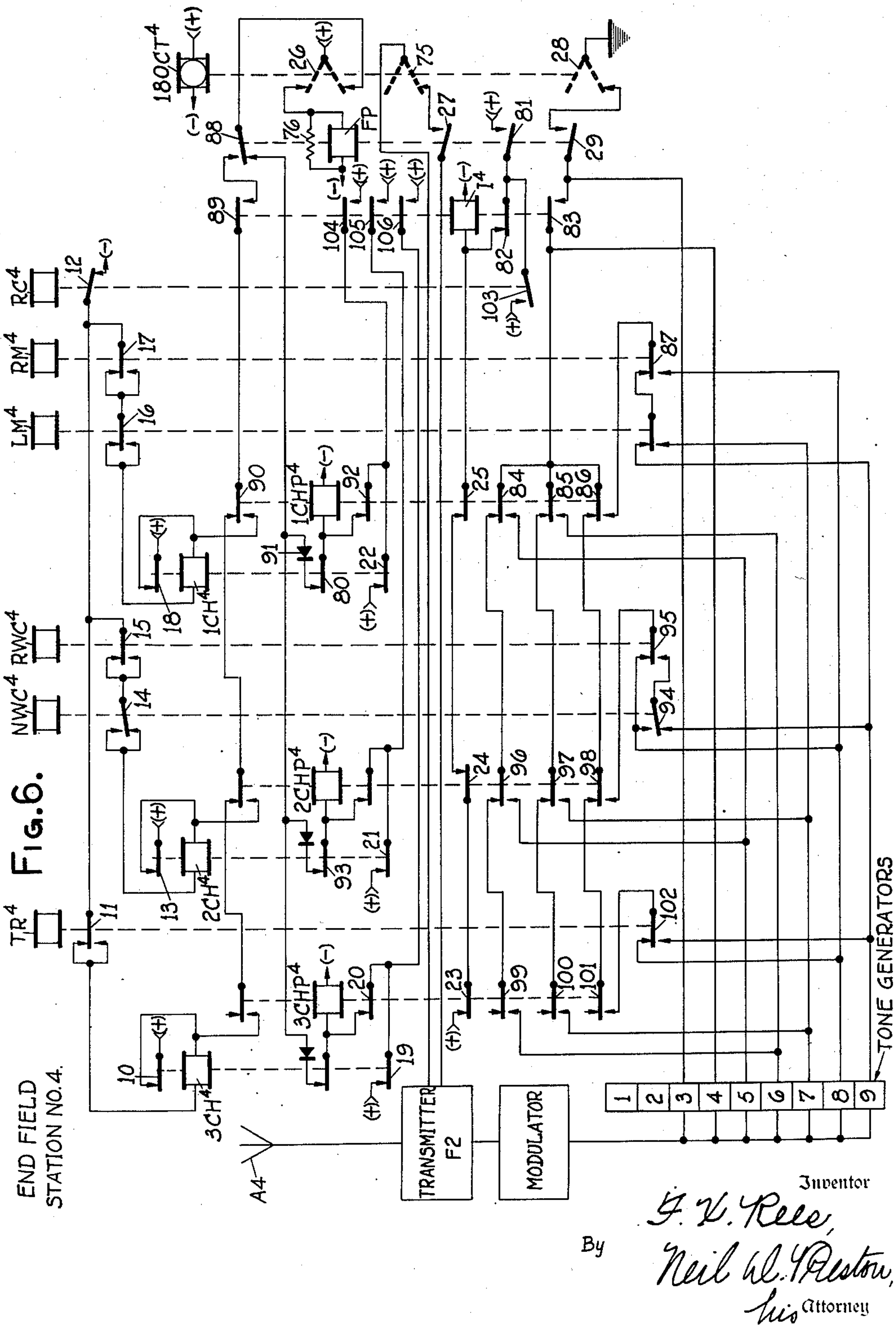
Fig. 6 illustrates the organization of apparatus at the end field station No. 4 for the transmission of indications to field station No. 3.

With reference to Fig. 6, the indication communication apparatus for the most distant field station of the system is illustrated wherein the oscillator $180CT^4$ is normally active to initiate the communication of indication pulses. It is to be understood that any suitable pulse forming means may be employed but for this embodiment of the present invention it is assumed that the pulses are formed by a suitable oscillator such as is disclosed, for example, in the patent to O. S. Field, No. 2,351,538 dated June 20, 1944. The oscillator $180CT^4$ is assumed to generate 180 pulses per minute with "off" and "on" periods of substantially the same duration. The oscillator is so constructed so as to have contacts closed during the "on" period which is illustrated as an upper dotted position and contacts closed during the "off" period as illustrated by the dotted downward position.

For the purpose of initiating the communication of indications from the end field station No. 4 as illustrated in Fig. 6 a change relay CH is associated with each device to be indicated at the control office, and such relay is maintained normally energized by a stick circuit which is opened in response to a change in its associated device. Associated with each change relay CH is a repeater relay CHP, the contacts of which actually govern the frequencies at which transmitted pulses are modulated.

A bank of tone generators is provided at field station No. 4 as illustrated in Fig. 6 for generating the frequency currents used for modulation of the carrier output of a suitable transmitter F2. Each of the tone generators includes a control tube such as the tube T1 shown as part of the typical tone generator illustrated in Fig. 7.

It is thus provided that the input to the respective tone generators is selected by the relays CHP, together with their associated devices to have their positions indicated, and applied to the tone generators in the form of the pulses generated by the oscillator $180CT^4$; and in turn, the output frequency current of the tone generators is applied in the form of pulses through the modulator to the transmitter F2 for modulation of the carrier wave radiated by the antenna A4. It is thus provided that the transmitter F2 output as applied to the antenna A4 is at a constant carrier frequency F2, and such output is modulated by one or more tones during "on" periods comparable to the "on" periods formed by the oscillator $180CT^4$.

The apparatus associated with the communication of indications to the next station nearer the control office from each of the intermediate field stations (see Figs. 5 and 6) is comparable to that described for the end field station No. 4 except that the oscillator 180CT at each of such intermediate field stations is normally inactive, and the respective "off" and "on" periods governing the transmission of modulations from that intermediate field station are governed in response to the reception of pulses from the next distant field station. Thus the receiving antenna A5 of Fig. 5 receives pulses from the transmitter F2 of the field station No. 4 (see Fig. 6), and applies such pulses to the receiver F2 (see Fig. 5) at field station No. 3.

Figure 5:
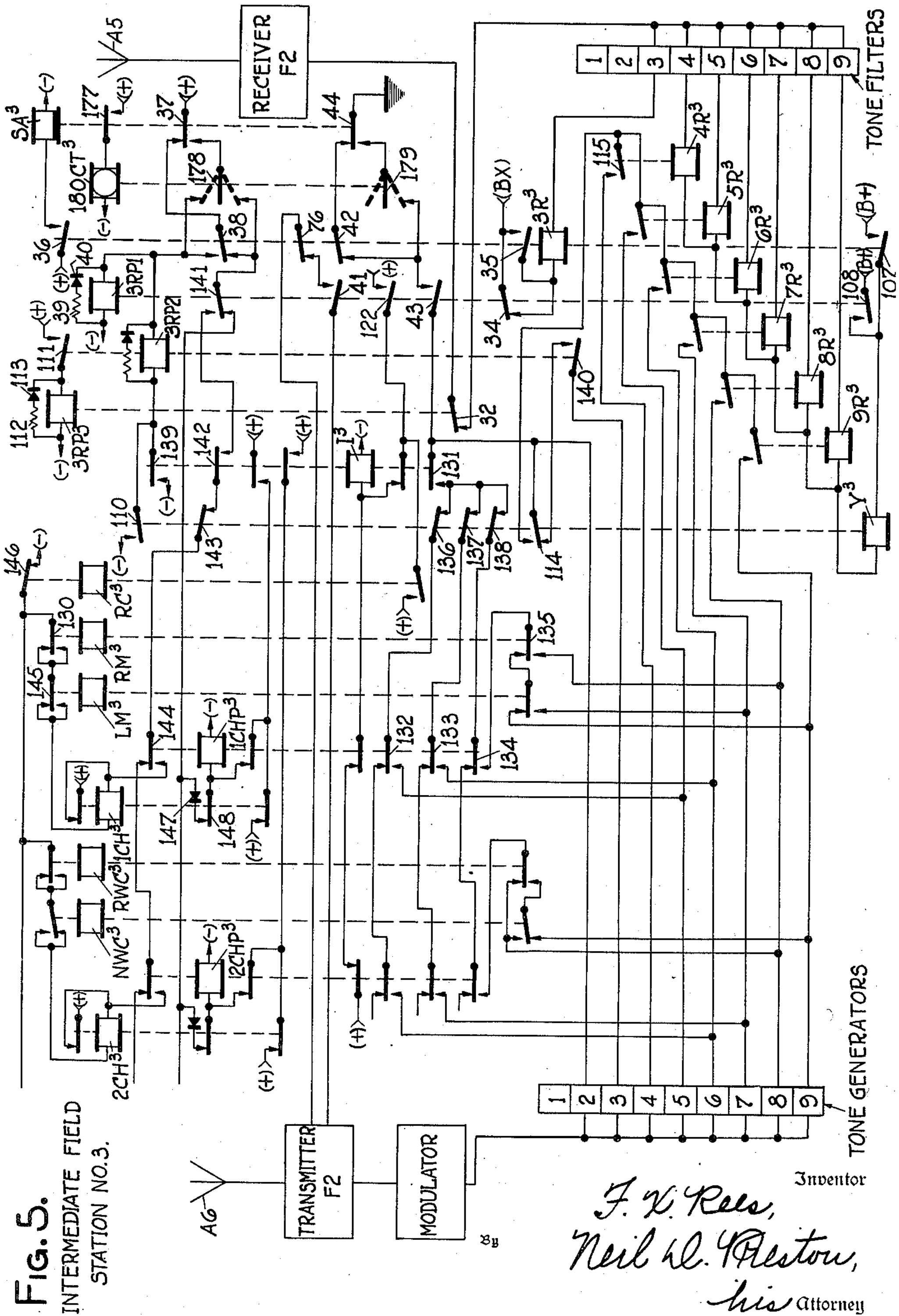
Fig. 5 illustrates the organization of apparatus at the intermediate field station No. 3 for the communication of indications to the field station No. 2.

A bank of tone filters is provided at field station No. 3 as illustrated in Fig. 5 to be used in rendering a bank of relays R distinctively responsive to the tone modulations of the pulses received from the next distant field station. The relays R are used in relaying indications through the field station with which they are associated from the next distant field station to the next field station nearer the control office.

The receiver relays 3RP1, 3RP2 and 3RP3 at station No. 3 are energized in response to pulses received at field station No. 3, and these relays are provided with slow drop away characteristics in accordance with shunting resistor and rectifier circuit combinations in order to provide desired timing operations in a manner and for purposes to be more readily apparent as the description progresses.

The relay $Y^3$ is used in allowing the modulation of the transmitter F2 at field station No. 3 in accordance with indications to be transmitted from that field station only at times when there are no indications to be relayed through from the next distant field station. There is therefore a bank of tone filters provided at field station No. 3 which are selectively rendered active to modulate the transmitter F2 at that station either in accordance with indications to be transmitted from field station No. 3, or in accordance with indications relayed through field station No. 3 from a more distant field station. The output frequency currents of the tone generators is fed through a suitable modulator to the input of the transmitter F2, and the antenna A6 radiates the carrier frequency F2 (the same for each field station) which is selectively modulated by one or more tones. The apparatus thus described as being employed at the intermediate field station No. 3 for the communication of indications is to be considered as typical of the indication communication apparatus provided at field station No. 2 or at other field stations as may be required in practice, such apparatus differing only in minor respects in each of intermediate stations because of the different tones used for station call purposes in a manner to be hereinafter more specifically considered.

Figure 3:
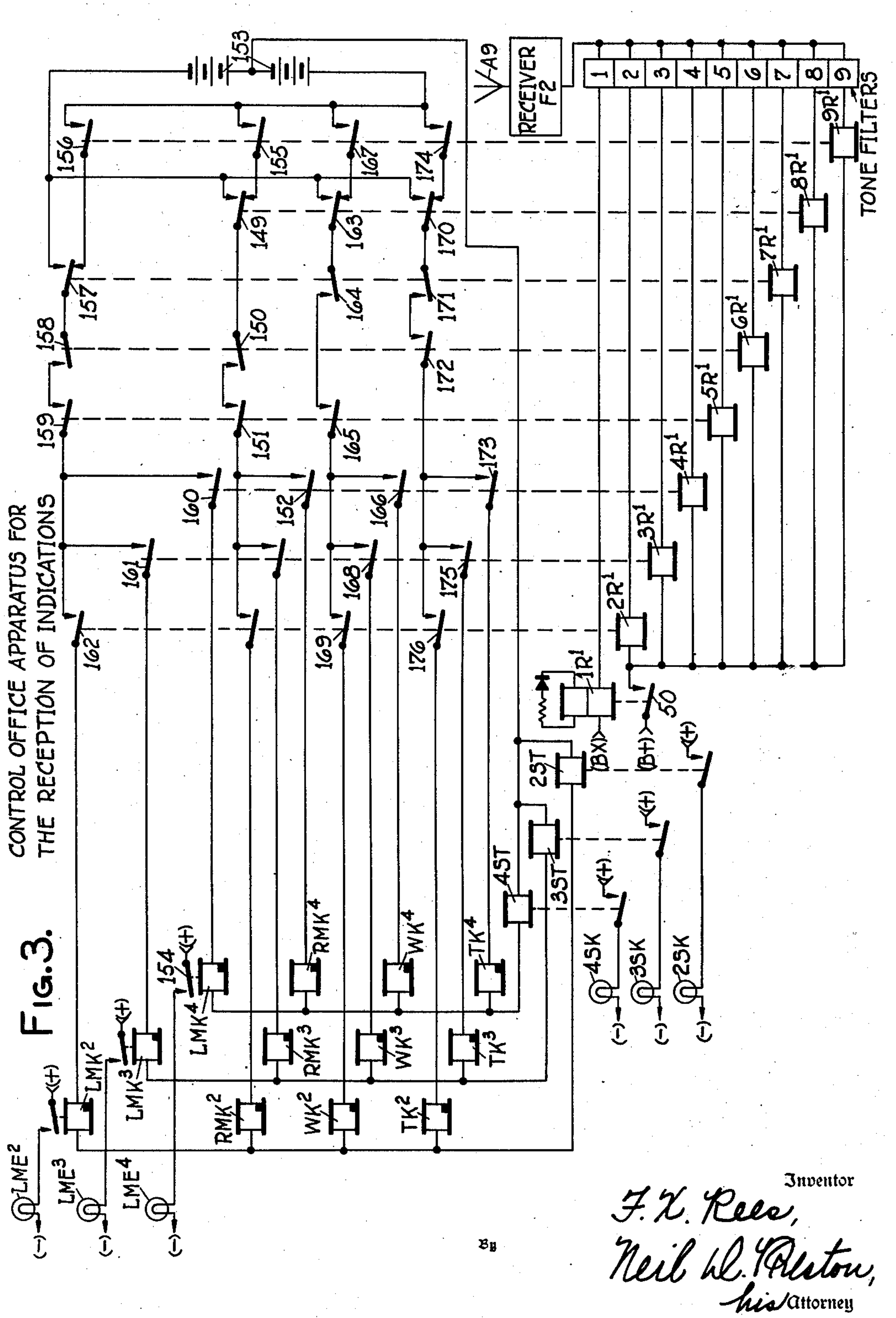
Fig. 3 illustrates the organization of apparatus at the control office for the control of indicator lamps in accordance with indications received from the field stations.

With reference to Fig. 3, the apparatus at the control office for the reception of indications is illustrated wherein the antenna A7 applies to a suitable receiver F2 that which is transmitted from the nearest field station for the communication of indications. The receiver F2 is tuned to the frequency F2 used for the communication of indications, and such receiver has a demodulated output which is fed to the input of a bank of tone filters used in governing the selective energization of a group of relays R, one relay R being provided to be responsive to the output of each tone filter. A bank of magnetic-stick relays is provided as illustrated in Fig. 3, together with associated indicator lamps, and these magnetic-stick relays are selectively positioned to govern the energization of the respective indicator lamps in accordance with the conditioning of the relays R during each pulse received from the nearest field station.

Having thus considered the general organization of the system according to this embodiment of the present invention, the circuit organization will be hereinafter more specifically described together with the mode of operation of the system under certain typical operating conditions to be encountered in practice.

OPERATION

*Use of tones*

The tones used in this embodiment of the present invention are preferable within the audio range of frequencies, although it is to be understood that other frequency ranges can be employed such, for example, as the use of higher frequencies where it is desired to employ crystal filters and crystal controlled frequency generators as is disclosed, for example, in the application of Donald Blaisdell Ser. No. 758,833, dated July 3, 1947.

A suitable range of frequencies for tones used in this embodiment of the present invention is found between 3,000 and 5,500 cycles, and it is found that where LC filtering means is employed, a separation of 300 cycles between tones is sufficient to prevent interference between respective tone channels. Care must of course be exercised to allocate tone frequencies within a band where harmonics cannot cause erroneous controls or indications.

It will be apparent that a sufficient number of distinctive tone frequencies can be allocated within the band from 3,000 to 5,500 cycles to allow the assignment of a distinctive tone for the station call of each of as large a number of field stations as may be employed in the CTC system, there being only a small number of distinctive tones required for the communication of the respective switch and signal and maintainer's call and recheck controls to any particular station which is called. For the purpose of simplification of the present disclosure, however, the number of distinctive tones employed for both the communication of controls and the communication of indications has been maintained at a minimum rather than unnecessarily complicating the present disclosure by employing a larger number of tones than are actually required for a simple embodiment which is particularly adapted to disclose the mode of operation of the system and the manner in which the system can be expanded to meet the requirements of practice.

With reference to Fig. 9, a table is shown of tones used for modulating the control carrier frequency F1 for the transmission of controls from the control office, each tone being identified by a number indicative of a distinctive assigned tone frequency. According to this table the tones Nos. 2 and 3 are provided for calling the field stations Nos. 2 and 3 respectively, as it is assumed that for this embodiment of the present invention the field stations Nos. 2 and 3 are the only control stations (see Fig. 2) employed. It is to be understood, however, that if a larger number of stations is employed, a distinctive tone is assigned to the station call for each of such larger number of control stations.

The tones Nos. 4, 5, 6, 7 and 8 are used in the transmission of switch and signal controls from the control office, and the tones Nos. 1 and 9 are used in the transmission of recheck and maintainer's call controls respectively.

With reference to Fig. 10, a table of the tones is illustrated which are used in modulating a carrier frequency wave F2 for the communication of indications. Similar to the allocation of tones for the communication of controls, a distinctive tone is allocated for the call of each indication field station, the stations being called successively, however, by link transmission from the more distant stations. It will be noted that the station call tones assigned to the respective stations for station call are also used by these stations for station registration at the control office to identify the stations transmitting indication tones. As a matter of convenience the tone numbers for station call and station registration have been made to correspond to the number of the indication field stations to which they are assigned. Thus tone No. 2 is used for registration at the control office for station No. 2, tone No. 3 is used for registration of indication station No. 3, and tone No. 4 is used for registration of indication station No. 4. Additional field stations will of course require the assignment of additional distinctive tones for registration and call purposes.

It is further provided that these indication station tones serve a dual purpose in that they are also used for station calling. The indication station call tones are used in link communication wherein each time station No. 3 is to be called from station No. 4, the tone No. 3 is used as a station call tone, and similarly the calling of station No. 2 from station No. 3 is accomplished by use of the station call tone No. 2. The tone No. 1 is reserved for the calling of the control office by the nearest indication field station which is assumed to be indication field station No. 2.

Although it will be readily apparent that a single distinctive tone can be used for communication of each of the indications at a given indication field station to the control office, as a matter of economy in the number of distinctive tone filters and generators required, and for other considerations, it is provided that a distinctive combination of three tones simultaneously transmitted is used for the communication of each indication. Thus, for example, the tones Nos. 5, 6 and 7 are simultaneously transmitted for indicating a signal clear for governing traffic to the left, and the combination of tones Nos. 5, 6 and 8 is used for an indication of a signal clear for governing traffic to the right.

*Normal conditions*

Normally the system is inactive for the communication of controls, and it is rendered active only in response to the manual actuation of a start button SPB (see Fig. 1). The transmission of a carrier wave at the frequency F1, is however rendered constantly effective by the office transmitter F1, although it is to be understood that means may be provided for the purpose of saving power, and for other considerations, to permit the radiation of energy from the antenna A1 only during the transmission of a control modulated pulse.

At the field stations (see Fig. 2) the track switches 2SW and 3SW are assumed to be normally in alignment for through traffic movements on the main track, and the signals governing traffic through such track switches are normally at stop in accordance with the usual practice in signaling organizations of this character.

The reception at the field stations by the antennas A2 and A3 (see Fig. 2) of the carrier wave applies an input to the receivers F1 at the respective field stations, but normally there is no demodulated output of the receivers because the carrier wave received at the frequency F1 normally has no modulations, as modulations are applied only in response to the actuation of a start button SPB at the control office for the transmission of a control pulse.

Each of the change relays CH at the field stations (see Fig. 4–6) is maintained normally picked up by its stick circuit which in addition to extending through contacts of the associated devices to be indicated extends through a contact of the recheck relay RC at that station. The relay $3CH^4$, for example, (see Fig. 6) is associated with the transmission of track occupancy indications in accordance with the position of the track relay TR which is assumed to be governed by the OS track section at field station No. 4 comparable to the manner in which the track relay 2TR is indicated as being associated with OS track section 2T at field station No. 2. Thus the stick circuit for the relay $3CH^4$ extends from (+), including front contact 10 of relay $3CH^4$, winding of relay $3CH^4$, contact 11 of the track relay $TR^4$, and back contact 12 of the recheck relay $RC^4$, to (−).

Similarly the relay $2CH^4$ which is associated with the transmission of switch indications is normally maintained picked up by its stick circuit which extends from (+), including front contact 13 of the relay $2CH^4$, winding of relay $2CH^4$, contact 14 of the normal switch correspondence repeater relay $NWC^4$, contact 15 of the reverse correspondence switch repeater relay $RWC^4$, and back contact 12 of relay $RC^4$, to (−).

The relay $1CH^4$ is associated with a change in the signals at field station No. 4, and thus its stick circuit is dependent upon the signal stop repeater relay contacts 16 and 17. Such stick circuit extends from (+), including front contact 18 of relay $1CH^4$, winding of relay $1CH^4$, contact 16 of relay $LM^4$, contact 17 of relay $RM^4$, and back contact 12 of the recheck relay $RC^4$, to (−).

In accordance with the normal energization of each change relay $CH^4$ at field station No. 4, the associated relay $CHP^4$, are also maintained picked up because of the energization of its stick circuit which is dependent upon the associated relay $CH^4$. Thus the relay $3CHP^4$ is maintained picked up by a stick circuit extending from (+), including front contact 19 of relay $3CH^4$, front contact 20 of relay $3CHP^4$, and winding of relay $3CHP^4$, to (−). In a similar manner the relay $2CHP^4$ is maintained picked up by a stick circuit in accordance with closure of front contact 21 of relay $2CH^4$, and the relay $1CHP^4$ is maintained picked up in accordance with closure of front contact 22 of relay $1CH^4$.

Figure 4:
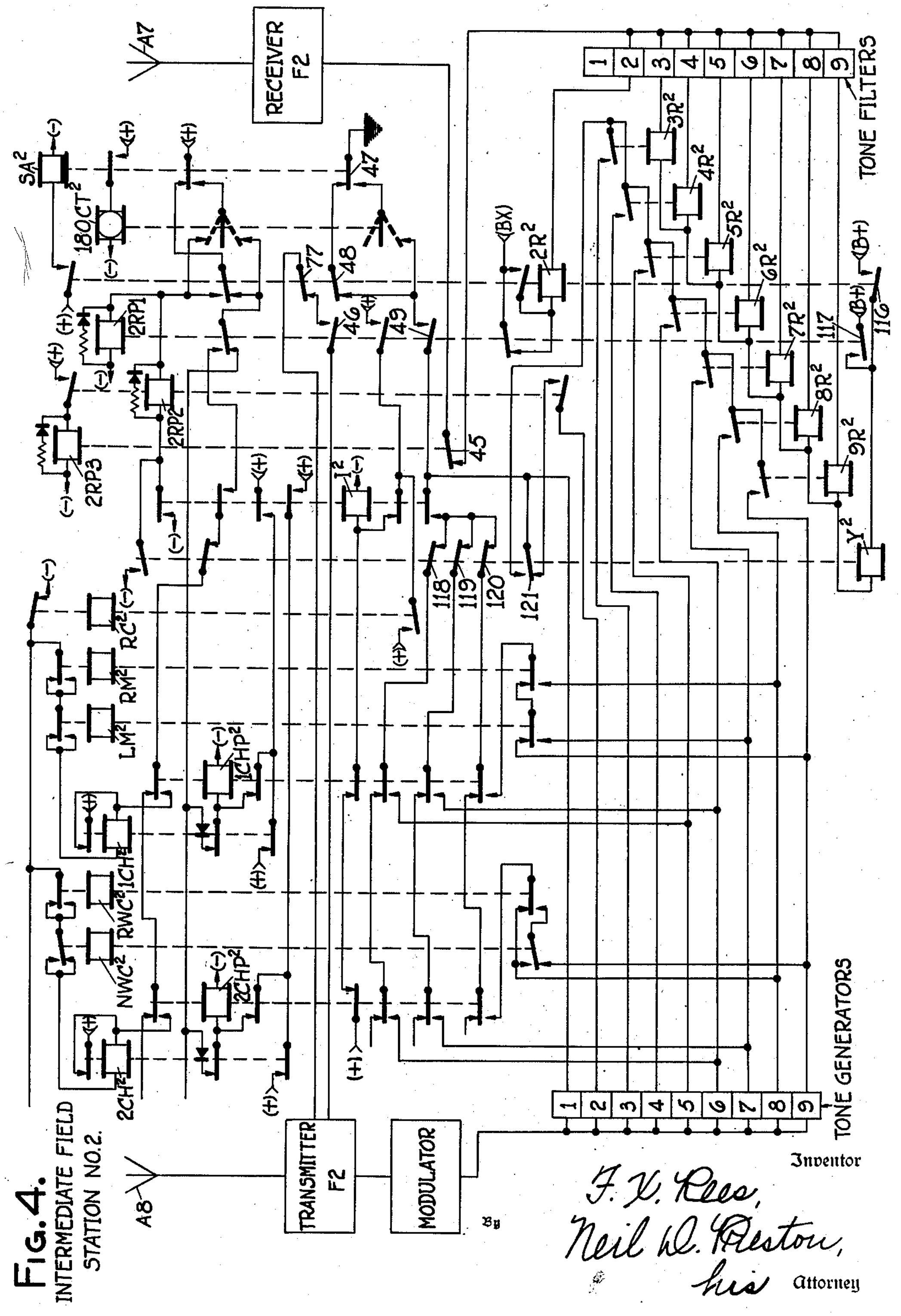
Fig. 4 illustrates the organization of the apparatus at the intermediate field station No. 2 for the communication of indications to the control office.

With all of the relays $CHP^4$ picked up, the indication control relay $I^4$ is maintained picked up in accordance with there being no indications to transmit. The relay $I^4$ is energized under such conditions by a circuit extending from (+), including front contact 23 of relay $3CHP^4$, front contact 24 of relay $2CHP^4$, front contact 25 of relay $1CHP^4$ and winding of relay $I^4$, to (−). It is thus provided that the dropping away of any relay $CHP^4$ because of the dropping away of its associated relay $CH^4$ is effective to cause the dropping away of relay $I^4$ and thereby render the modulation of the next pulse to be transmitted effective in a manner to be hereinafter considered. Having thus considered the circuits by which the relays $CH^4$ and $CHP^4$ at field station No. 4, and the relay $I^4$ at that station, are maintained picked up, it is to be understood that similar relays at other field stations, such, for example, as at field stations Nos. 2 and 3 as illustrated in Figs. 4 and 5 respectively are maintained picked up by the energization of similar stick circuits.

With reference to Fig. 6, each time that an "on" period is created during normal conditions at a time when there are no indications to be transmitted, the relay FP is picked up by the energization of an obvious circuit closed at contact 26 of oscillator $180CT^4$ in its upper position, and in accordance with the picking up of that relay, the closure of its front contact 27 conditions a circuit whereby the shifting of oscillator contact 75 to its lower position causes radiation from the antenna A4 to be rendered effective, and the carrier wave radiated is modulated by the frequency of the tone generator No. 3.

The tone generator No. 3 of Fig. 6 is rendered effective to apply its output to the modulator because of the connection of ground to shunt the bias of a control tube governing the output of the tone generator No. 3. Such ground connection includes contact 28 of oscillator $180CT^4$ in its lower position and front contact 29 of relay FP to the tone generator No. 3. Inasmuch as tone generators are well known to those familiar with the art, it is believed unnecessary to show specifically the details of such generators and their control tubes, but, for the purpose of facilitating the understanding of the present invention, a typical tone generator which may be employed is illustrated more specifically in Fig. 7 wherein the oscillator generates the particular tone frequency to be employed, and the output of such oscillator is applied through the coupling condenser C1 to the grid of the tube T1. The tube T1 is normally nonconductive in its anode-cathode circuit because of the negative bias of the battery 30 which is connected between the cathode and the grid through the resistors R1 and R2.

When it is desired to render the tube T1 of Fig. 7 conductive so as to apply the frequency current generated by the oscillator to the modulator, and in turn to the transmitter, the bias battery 30 is shunted through the limiting resistor R1 to thus connect the cathode to the grid through the resistor R2 and thus bypass the negative grid bias normally provided by the battery 30. It is thus provided that the connection of ground to the lower terminal of the resistor R2, as is accomplished by the closure of front contact 31 of the control relay C of Fig. 7 is effective to render the tube T1 conductive. Similarly, with reference to Fig. 6, and also to the other drawings wherein tone generators are employed, the input wires to the respective tone generators when connected to ground render the outputs of those tone generators effective to apply an input to the associated modulator, and those input wires can be assumed to be connected to respective terminals comparable to the lower terminal of the resistor R2 of Fig. 7.

It is therefore provided that a ground connection is closed during each "off" period of the oscillator $180CT^4$, when the relay FP is picked up, to permit an output of the tone generator No. 3, and such output of the tone generator is applied to the modulator, and after amplification the tone frequency current output of the modulator acts upon the transmitter F2 to modulate the pulse of the carrier wave which is radiated from the antenna A4 with the particular tone characterized by the tone generator No. 3.

Upon termination of the pulse by the dropping away of relay FP, the opening of contact 29 terminates the modulation and the opening of contact 27 terminates radiation of the carrier from the antenna A4. Because of the relay FP having its circuit opened by the shifting of contact 26 to its lower position, the drop away time of relay FP as governed by the resistor 76 determines the duration of each pulse transmitted from field station No. 4.

In this manner pulses are intermittently transmitted from the end field station No. 4 at the rate of the oscillator $180CT^4$ under normal conditions with a single modulation applied to each pulse by the tone generator No. 3 at that station as a station call tone to call the next field station toward the control office. Such next field station is illustrated in Fig. 5 as being intermediate field station No. 3, and although other field stations may receive the pulses transmitted from field station No. 4, only the field station No. 3 is responsive because of the particular station call modulation of these pulses.

Thus that which is received by the antenna A5 (see Fig. 5) is applied to the receiver F2 of Fig. 5, and the demodulated output of the receiver F2 is applied through the back contact 32 of relay 3RP3 to the input terminals of the respective tone filters Nos. 3, 4, 5, 6, 7, 8, and 9. The filters Nos. 1 and 2 of this tone filter bank are not used as the corresponding tones are used only as station call and station registration tones of a field station nearer to the control office, and as a call for the control office itself.

Inasmuch as it has been described that only the tone No. 3 is normally applied to the pulses transmitted, there is an output of the tone filter No. 3 only, and such output is effective to energize the relay $3R^3$. For the purpose of simplification of the disclosure of this embodiment of the present invention, the circuits for the tone filters have not been shown in detail, but the organization of such filters can be according to the typical tone filter circuit which is illustrated in Fig. 8, or other types of tone filters may be employed in accordance with the requirements of practice.

With reference to Fig. 8, it is illustrated that the output of a receiver which may be tuned to either the control or indication frequency F1 or F2, as required, is fed through an amplifier and applied through the coupling condenser C2 to the input of a suitable trigger circuit organization and a suitable LC tank circuit is connected between the input of the trigger circuit and ground. The LC circuit comprises a condenser C3 and an inductance L1 connected in multiple, and this tank circuit bypasses the output of the amplifier to ground for frequencies other than the resonant frequency of the LC circuit, at which frequency the high reactance of the LC circuit permits sufficient current to flow in the trigger circuit to actuate such trigger circuit so as to provide an input for the gas tube T2 through a suitable coupling condenser C4.

The tube T2 can be a "thyratron" tube or a tube of this general character having the general characteristics of being non-conductive because of a negative grid bias supplied by a suitable negative bias battery 33 and adjustable grid resistor R3. The negative bias is so adjusted as to allow the tube T2 to be rendered conductive when there is an output of the trigger circuit associated therewith. Once the gas tube T2 is fired, the control relay R associated with that tone filter becomes energized in the anode-cathode circuit of the gas tube, and its energization is maintained until the gas tube becomes deionized. The deionization may take place in some cases by the opening of the anode-cathode circuit by a relay contact, and in other cases, the deionization of the gas tube is rendered effective by the use of alternating current for the power supply used in the anode-cathode circuit. In case alternating current is employed, the relay R in the anode-cathode circuit of the tube is maintained picked up only so long as the control grid of the gas tube is maintained sufficiently positive to render the tube conductive. The relay R associated with the typical tone filter of Fig. 8 is illustrated as having its control circuit energized by a suitable direct current "B" supply wherein (B+) is applied to the anode-cathode circuit through suitable contact selections which will be hereinafter considered for use in deionizing the associated gas tube. The cathode of the gas tube T2 is illustrated as being connected to both B− and to CX, as a return circuit for either alternating current or direct current power supplies as may be employed for different tone filters.

Thus assuming that the tone filter No. 3 of

Fig. 5 is organized according to the typical tone filter which has been heretofore described, the gas tube of the filter becomes ionized only in response to the output of the receiver F2 of the tone No. 3 frequency. In such a case the relay $3R^3$ is picked up in the anode-cathode circuit of the gas tube wherein BX is applied through back contact 34 of relay 3RP1 and winding of relay $3R^3$, to the anode of the gas tube. The picking up of relay $3R^3$ by the closure of its stick contact 35 shunts the back contact 34 of relay 3RP1 out of the circuit which has been described as the relay 3RP1 is picked up in response to the picking up of relay $3R^3$. It is thus provided that the relay $3R^3$ is pulsed at a rate corresponding to the rate of the pulses received by the antenna A5, such relay being maintained picked up for a period of time corresponding to the duration of each pulse because of the use of alternating current for its energization through its associated gas tube whereby its energization is directly controlled in accordance with the positive energization of the control grid of the gas tube as a result of the reception of the pulse at the tone modulation No. 3.

Because of the pulsing of the relay $3R^3$ in response to the respective pulses received at station No. 3, the relay $SA^3$ which has slow drop away characteristics is maintained steadily picked up by the intermittent closure of front contact 36 of relay $3R^3$. It is thus provided that the relay $SA^3$ is maintained steadily picked up, and thereby renders the oscillator $180CT^3$ normally inactive. It also selects that the pulse transmitted from field station No. 3 is measured by the dropping away time of relay 3RP1.

The relay 3RP1 is picked up in response to the picking up of the relay $3R^3$ at the beginning of each pulse received by the energization of a circuit extending from (+), including front contact 37 of relay $SA^3$, front contact 38 of relay $3R^3$ and winding of relay 3RP1 to (−). The winding of the relay 3RP1 is shunted by the resistor 39 and the halfwave rectifier 40 connected in series so as to render the relay 3RP1 quick in picking up but slow in releasing in accordance with the desired mode of operation. It is well known that the drop away time is adjustable by varying the resistance of the resistor shunting the winding of the relay, and thus a proper resistance is selected for this resistor 39 to provide for a drop away time substantially comparable to the duration of the respective "on" periods which have been heretofore considered as being transmitted down at field station No. 4.

It is thus provided that in response to the dropping away of the relay $3R^3$ at the end of each pulse received, the transmitter F2 is rendered active to transmit a carrier wave by the closure of front contact 41 of relay 3RP1 in series with back contact 76 of relay $3R^3$. The dropping away of relay $3R^3$, by the closure of its back contact 42 in series with the front contact 43 of relay 3RP1, renders the tone generator No. 2 effective to modulate the carrier wave transmitted from field station No. 3. The circuit extending from ground including front contact 44 of relay $SA^3$, back contact 42 of relay $3R^3$, and front contact 43 of relay 3RP1 shunts the negative bias of the normally non-conductive gas tube associated with tone generator No. 2 which corresponds to the tube T1 of Fig. 7, and thus renders tone generator No. 2 effective to modulate the carrier wave transmitted by the transmitter F2 at field station No. 3. It is thus provided that in response to the reception of each pulse transmitted from indication station No. 4 that is modulated by tone No. 3, a pulse is transmitted from field station No. 3 that is modulated with tone No. 2 for calling indication station No. 2.

The field indication station No. 2 receives the pulses transmitted from indication station No. 3, such pulses being modulated according to the frequency of tone No. 2. The antenna A7 at the field station No. 2 (see Fig. 4) is effective in a manner comparable with that described for field station No. 3 to relay the pulse through to the next station. The next station is assumed to be the control office, and thus the station call tone No. 1 for calling the control office is applied to the pulse transmitted from field station No. 2.

To consider more specifically the mode of operation at the indication station No. 2 under normal conditions of the system, reference is made to Fig. 4 in which the output of the receiver F2 is fed through the back contact 45 of relay 2RP3 to the input terminals of the respective tone filters. Inasmuch as the input to the tone filters under normal conditions is only at the frequency of tone No. 2, tone filter No. 2 of Fig. 4 is the only tone filter having an output. The relay $2R^2$ is energized for each pulse received by the antenna A7 in the output circuit of the tone filter No. 2 by the energization of a pick up and a stick circuit comparable to that which has been described more specifically for the energization of the corresponding relay $3R^3$ at indication field station No. 3 (see Fig. 5).

The relays $SA^2$ and 2RP1 are actuated in response to the relay $2R^2$ in a manner comparable to that which has been described for similar relays at field station No. 3, and the oscillator $180CT^2$ is normally inactive as has been described for the corresponding oscillator at indication field station No. 3.

When the relay $2R^2$ is dropped away at the end of a pulse received from indication station No. 3, the tone generator No. 1 at that indication station is rendered effective to modulate the wave transmitted by the transmitter F2 which is rendered active at the end of the pulse upon the closure of front contact 46 of relay 2RP1 in series with back contact 77 of relay $2R^2$. It is thus provided that a pulse modulated by tone generator No. 1 is radiated from the transmitting antenna A8 of indication station No. 2 subsequent to the reception of each pulse by the antenna A7 from the next distant indication field station. The ground connection shunting the negative bias which renders tone generator No. 1 effective to modulate the carrier wave transmitted extends from ground, including front contact 47 of relay $SA^2$, back contact 48 of relay $2R^2$ and front contact 49 of relay 2RP1 to the grid of the control tube used in governing tone generator No. 1.

At the control office the antenna A9 (see Fig. 3) receives the pulses radiated by the antenna A8 at the indication field station No. 2, and thus the demodulated output of the receiver F2 at the control office is applied to the tone filters so that the tone No. 1 which is applied to the respective pulses transmitted from field station No. 2 triggers the gas tube associated with tone filter No. 1 and thus provides for the energization of the relay $1R^1$ so long as the pulse is received. The lower winding of the relay 1R[1] is energized by alternating current so that deionization of the associated gas tube is rendered effective immediately upon the cessation of each pulse received by the antenna A9. The picking up of relay 1R[1] by the closure of front contact 50 applies (B+) to the windings of the respective relays 2R[1] to 9R[1] inclusive so as to condition such relays so that they may be responsive to indication and station registration tones that may be received during that pulse. It is considered at present however that the normal conditions of the system exist wherein no indications are communicated, and therefore these relays are not responsive under the normal conditions being considered.

*Transmission of controls from the control office*

Inasmuch as the communication of controls is on a different carrier frequency than is used for the communication of indications, it will be readily apparent that various systems for the communication of controls can be employed without requiring modification of the system herein provided for the communication of indications, and similarly other types of systems can be used for the communication of indications in combination with the organization disclosed in Figs. 1 and 2 for the communication of controls.

The communication of controls is effective immediately upon the actuation of a start or send push button SPB preferably disposed upon the panel of the control machine, and thus no storage of designated controls is required, as all controls are transmitted immediately upon the actuation of the associated start button. It is a matter of choice as to whether or not the button circuits are to be interlocked so that there can be no interference in case two buttons are simultaneously actuated, and according to Fig. 1 an interlock is provided between the buttons 2SPB and 3SPB whereby the contacts of the relay 2—3C which repeat the button 2SPB are employed to segregate the circuits associated with the respective buttons so as to render the button 2SPB superior to the button 3SPB in case both buttons are simultaneously actuated. If this interlock is not required in practice, the respective wires connected to the center or common terminals of the various control switches for each field station can be broken through respective contacts of the associated start buttons SPB so as to be connected to ground when that button is actuated rather than using means such as the relay 2—3C to select transmission in accordance with whichever button is actuated.

Where there are more than two field stations in the system, and if an interlock is required in practice to prevent interference between the start buttons SPB when a plurality of buttons are simultaneously actuated, a selector system can be employed such as is shown, for example, in the prior application of Donald Blaisdell Ser. No. 758,833 filed July 3, 1947. According to such application a station selector unit is provided at the control office for governing the sequence of transmission of respective control cycles in accordance with a predetermined order of superiority so that for one complete cycle of operation of the selector unit, the control office can transmit a control pulse, or cycle of pulses to each field station. It is also to be understood that a system for allowing transmission to but one field station at a time such as is disclosed in the patent to W. D. Hailes, et al. No. 2,399,734 dated May 7, 1946 can be employed if desired.

With reference to Fig. 1 each of the tone generators illustrated is assumed to be of a structure such as is shown in Fig. 7, for example, wherein the connection of ground to the input wire of each of the respective tone generators renders that generator effective to modulate the associated transmitter F1. It is thus provided that the connection of ground to the input wire of the tone generator No. 1 is effective to modulate the carrier wave transmitted at the frequency F1 for the transmission of a recheck control for the recheck of indications according to the tone chart of Fig. 9, and according to the general assignment of tones as has been heretofore described.

The particular field station for which the control is intended is identified by a distinctive station call tone assigned to that station, and according to the code chart of Fig. 9, tone No. 2 has been assigned to be used for calling the field station No. 2 and the tone No. 3 has been assigned for calling field station No. 3. These tones are selected for transmission in accordance with the particular button SPB that is actuated. Thus if the button 2SPB is actuated, tone No. 2 is transmitted for calling field station No. 2, and if the button 3SPB is actuated tone No. 3 is transmitted for calling field station No. 3.

More specifically, the actuation of the button 2SPB is effective to pick up the relay 2—3C, and the picking up of that relay closes a circuit for rendering the control tube conductive of the tone generator No. 2. Thus by the connection of ground to the input control wire C2 through front contacts 51 and 52 of the relay 2—3C, the control tube governing the output of the tone generator No. 2 is rendered conductive, and there is a tone generator output at the tone frequency No. 2 applied through the modulator to the transmitter F1 for modulation of the carrier wave radiated at the carrier frequency F1 by the antenna A1. It will be noted that by the picking up of the relay 2—3C the opening of back contact 52 prevents the tone generator No. 3 from being rendered effective to modulate the carrier wave in case the buttons 2SPB and 3SPB should inadvertently be actuated simultaneously.

It is similarly provided that if the field station No. 3 is to be called, the actuation of the button 3SPB is effective through back contact 52 of relay 2—3C to connect ground to the control wire C3 governing the control tube of the tone generator for the tone No. 3 so as to render the output of the tone generator effective to modulate the carrier wave radiated by the antenna A1.

If an operator of the control machine desires to have a recheck of the indications at any particular field station he actuates the recheck lever RCL for that field station to its right-hand position and then actuates the start button SPB for that field station. More specifically, assuming that it is desired to have a recheck of the indications at field station No. 2, the lever 2RCL is actuated to its right-hand position, and the button 2SPB is actuated. The relay 2—3C is picked up in response to the actuation of the button 2SPB, and upon the picking up of relay 2—3C, ground is connected to the input control wire C1 of the tone generator No. 1 through front contact 51 of relay 2—3C, front contact 53 of relay 2—3C, and contact 54 of lever 2RCL in its right-hand position. Because of this circuit shunting the negative bias battery of the control tube for that tone generator, there is an output of tone generator No. 1 applied to the modulator, and the output of the modulator is effective to modulate the wave transmitted by the transmitter F1 so long as the button 2SPB is maintained in its actuated position.

In addition to the carrier wave being modulated by the output of the tone generator No. 1, and the station call tone, switch and signal control tones are transmitted at the same time to field station No. 2 in accordance with the positions of the switch and signal control levers 2SML and 2SGL respectively. Thus, according to the tone chart of Fig. 9, with the switch control lever 2SML in its left-hand position (normal switch position), the tone generator No. 4 is rendered effective to modulate the carrier wave by the connection of ground to the input wire C4 of that tone generator through front contact 51 of relay 2—3C, front contact 55 of relay 2—3C and contact 56 of lever 2SML in its left-hand position.

Assuming the signal control lever 2SGL to be in its center position for designating a stop control for the signals at field station No. 2, tone generator No. 8 is rendered effective to modulate the carrier wave of the transmitter F1 when the button 2SPB is depressed because of the connection of ground to the input wire C8 of the tone generator No. 8 through front contact 51 of relay 2—3C, front contact 57 of relay 2—3C and contact 58 of lever 2SGL in its center position.

It is thus provided that upon the actuation of the start button 2SPB when the control levers for field station No. 2 are in positions as illustrated (except that the recheck lever 2RCL is actuated to its right-hand position as heretofore described) a modulation pulse is applied to the carrier wave radiated by the antenna A1 having modulations of the distinctive tone generators Nos. 1, 2, 4 and 8 simultaneously applied thereto.

In a similar manner, other control pulses can be transmitted for the communication of other controls as required for governing the respective switches and signals and the maintainer's call indicators. That is, for example, the contact 58 of the signal control lever 2SGL can select one of three distinctive tones for transmission in accordance with its position. When the lever 2SGL is actuated to the right for clearing a signal governing traffic to the right, the tone generator No. 6 is selected to be effective by connection of ground to wire C6 to modulate the carrier wave when the button 2SPB is subsequently actuated, or the actuation of the lever 2SGL to its left-hand position is effective to render tone generator No. 7 effective by connection of ground to wire C7 to modulate the carrier wave when the button 2SPB is actuated.

If the track switch at field station No. 2 is to be operated to its reverse position, the lever 2SML is actuated to its right-hand position, and thus the contact 56 of that lever selects the tone generator No. 5 to be rendered effective to modulate the carrier wave radiated by the antenna A1.

If it is desired to call a maintainer at field station No. 2, the maintainer's call lever 2MCL is actuated to its right-hand position, and by such actuation the closure of contact 59 of that lever selects the tone generator No. 9 to have its output modulate the carrier wave radiated from the control office upon actuation of the button 2SPB.

It will be readily apparent that a similar mode of operation is effective for the transmission of controls to field station No. 3 in accordance with selections by the respective levers 3RCL, 3MCL, 3SML and 3SGL upon actuation of the associated button 3SPB. Corresponding generators are rendered effective to modulate the carrier wave for the respective positions of the various levers to tone generators that have been described as being effective to modulate the carrier wave as selected by similar levers associated with the transmission of controls to field station No. 2.

The transmission of controls to field station No. 3 therefore differs principally in the selection of the station call tone No. 3 for transmission rather than the station call tone No. 2 as has been described for transmission to field station No. 2. The circuit that has been described whereby the tone generator No. 2 was rendered effective to modulate the carrier wave for transmission to field station No. 2 is opened at front contact 51 of the relay 2—3C when transmitting to field station No. 3, and the closuse of back contact 52 connects ground to the control tube of tone generator No. 3 through the button 3SPB. Similarly the selective connection of ground to the control tubes of the respective tone generators is made effective when the button 3SPB is actuated through the respective back contacts 53, 60, 55, and 57 of the relay 2—3C. The front contacts 53, 60, 55 and 57 which have been described as being used in the circuits for transmission to field station No. 2 are open and thus the control of the tone generator is non-responsive to the positions of the respective levers provided for field station No. 2 when the button 3SPB is actuated for transmission to field station No. 3.

*Control of devices at field station*

With reference to Fig. 2, that which is transmitted from the control office is received by the antennas A2 and A3 at the respective field stations Nos. 2 and 3 as both of these field stations are assumed to be within range of the transmitter F1 at the control office. The receiver F1 at each of the field stations is tuned to the carrier frequency transmitted from the control office, and the output of each of the receivers F1 is applied to the bank of tone filters associated therewith. The output of the respective tone filters of each filter bank is of course dependent upon the tones received as modulations of the carrier wave radiated from the control office. Thus the modulated carrier wave is demodulated by each of the receivers F1, and the output of such receivers is applied to their associated tone filter banks as demodulated tones which can be at audio-frequency substantially corresponding to those used for modulation of the carrier wave at the control office, although it is to be understood that higher frequencies can be employed in accordance with the requirements of practice as has been heretofore pointed out.

As a matter of convenience in illustrating the manner in which respective tones are used for various purposes, the numbering of the tone filters has been made to correspond with the numbering of the tone generators at the control office and thus the tone filter No. 1 is responsive to the modulation of the carrier wave by tone generator No. 1 at the control office, tone filter No. 2 is responsive to the modulation of the carrier wave by tone generator No. 2, etc.

If there is an output of tone filter No. 2, at field station No. 2, the station relay 2SC which is connected in the output circuit of that tone filter is picked up in response to the station call of field station No. 2. The relay 2SC is energized in such output circuit by rectified alternating current because of its connection to the anode of the output gas tube to which alternating current is applied. It is thus provided that one terminal of the alternating current supply (BX) is connected to the winding of the station relay 2SC and the other terminal of the alternating current supply (CX) is connected to ground and thus to the cathode of the gas tube for that tone filter as shown in Fig. 8. If the station call transmitted from the control office is for station No. 3 by having modulations of tone No. 3 rather than tone No. 2, there is no station relay picked up at field station No. 2 but the station relay 3SC at field station No. 3 is picked up because of the output of the tone filter No. 3. It is thus provided that each field station has a station relay responsive to its station call tone, and such station relay is non-responsive to the station call tones of other stations.

Only upon the picking up of a station relay SC at a field station are the relays governed by the other tones rendered responsive to the tones received. Thus upon the reception of a control pulse from the control office having a plurality of distinctive modulations, the station relay must first be picked up at the station being called before the control tones can be effective to govern their associated devices at that field station. It is thus provided that the picking up of the relay 2SC in response to the call of station No. 2 from the control office is effective by the closure of front contact 61 to condition the recheck relay 2RC, the switch control relay 2WZ, the signal control relay 2LGZ, 2RGZ and 2B, and the maintainer's call relay 2MC so that such relays can be responsive to their associated control tones that are applied to that particular control pulse.

When the relay 2SC at field station No. 2 is picked up upon the reception of a control pulse, the relay 2RC can be picked up through front contact 61 of relay 2SC if tone No. 1 is applied to that pulse for a recheck of indications from the field station No. 2. If no recheck is called for, there is of course no tone No. 1 transmitted and thus the relay 2RC is non-responsive during such pulse.

The magnetic stick relay 2WZ is distinctively responsive to the reception of tone No. 4 or tone No. 5 of a control pulse transmitted for field station No. 2. When the tone No. 4 is received on the control pulse, the relay 2WZ is picked up to govern the operation of the track switch 2SW to its normal position. If the tone No. 5 is received, the relay 2WZ is dropped away and the track switch 2SW is operated to its reverse position. Although the details of the circuits have not been shown for the power operation of the track switch 2SW by the switch machine 2SM, such circuits have been indicated as being governed by the contacts 62 and 63 of the relay 2WZ, and the manner in which the switch machine 2SM is controlled by such contacts is well known to those skilled in the art.

The signal control relays 2RGZ and 2LGZ, rather than being of the magnetic-stick type, are preferably provided with stick circuits as illustrated whereby either of such relays when picked up is maintained picked up dependent upon passage of a train. The relay 2RGZ is picked up upon reception of tone No. 6 in response to an output of tone filter No. 6 by the energization of its upper winding through back contact 64 of relay 2LGZ and front contact 61 of the station relay 2SC. Upon the picking up of this relay, the closure of front contact 65 permits the clearing of signal 2LA or signal 2LB as selected by the position of the track switch 2SW. A stick circuit is established for the lower winding of the relay 2RGZ upon the picking up of that relay extending from (+), including front contact 66 of the track relay 2TR, back contact 67 of the relay 2B, front contact 68 of relay 2RGZ and lower winding of relay 2RGZ, to (−).

Similarly if the control pulse is modulated with tone No. 7, the relay 2LGZ is picked up for the clearing of signal 2RA or 2RB as selected by the position of the track switch 2SW. The relay 2LGZ can be picked up by the output circuit of tone filter No. 7 which includes the upper winding of relay 2LGZ, back contact 69 of relay 2RGZ and front contact 61 of relay 2SC. The closure of front contact 70 of relay 2LGZ is effective to permit the clearing of signal 2RA or signal 2RB. A stick circuit is established for the lower winding of relay 2LGZ upon the picking up of that relay through front contact 66 of relay 2TR, back contact 67 of relay 2B and front contact 71 of relay 2LGZ for governing the restoration to stop of the signal in response to the passage of a train, or in response to the communication of a stop control from the control office. Signal stop control can be transmitted from the control office in a manner which has been described whereby the tone No. 8 is used for modulation of the control pulse for station No. 2, and the relay 2B is energized in the output circuit of tone filter No. 8 through front contact 61 of the station relay 2SC.

If a maintainer's call is communicated from the control office to field station No. 2, the control pulse is modulated by tone No. 9, and the output of tone filter No. 9 is effective to pick up the maintainer's call relay 2MC by the energization of the upper winding of that relay through front contact 61 of the station relay 2SC. The relay 2MC when picked up energizes the maintainer's call indicator lamp 2MK upon the closure of front contact 72, and a stick circuit is closed through front contact 73 of relay 2MC to maintain the lamp 2MK illuminated until the maintainer's cancel button 2MPB is actuated to open such stick circuit.

Having thus described the manner in which the relays at field station No. 2 are responsive to control tones communicated from the control office, it is to be understood that such an organization of tone responsive relays is provided at each field station, and that the response of the control or application relays at each field station is dependent upon the station relay for that station as the relays at field station No. 2 are dependent upon the closure of front contact 61 of the station relay 2SC. The application relays at field station No. 3, for example, are dependent upon the picking up of the relay 3SC to close front contact 74 of that relay, but otherwise are governed the same as the corresponding relays at field station No. 2.

*Transmission of indications from end field station*

It has been described when considering the normal conditions of the system that the end field station No. 4 transmits so called permission pulses intermittently at a 180 per minute rate to field station No. 3, such pulses being modulated only by the tone No. 3 which is the station call tone for the next field station nearer to the control office. If a change takes place in one of the devices at field station No. 4 which is to be indicated at the control office, the next pulse subsequent to such change is modulated by selected tones in addition to the tone No. 3 for the communication of indications as to the new position of the device in which the change has occurred. In other words, the change in a device initiates a transmission of the indication of the new position of that device, but this is the only indication that is transmitted, as compared to transmitting the conditions of all of the devices at field station No. 4 each time that a change occurs.

To consider a typical condition for the transmission of an indication from field station No. 4, it will be assumed that a signal has been cleared at field station No. 4 in accordance with controls communicated from the control office for governing traffic to the right; and in accordance with the clearing of this signal, in a manner well known to those skilled in the art, the signal stop repeater relay $RM^4$ is dropped away, and the dropping away of that relay by the shifting of contact 17 interrupts the stick circuit for the change relay $1CH^4$ to cause that relay to be dropped away.

By the dropping away of the relay $1CH^4$, the relay $1CHP^4$ is dropped away because of the opening of its pick up and stick circuits at front contacts 80 and 22 respectively. Upon the dropping away of relay $1CHP^4$ the opening of its front contact 25 opens the pick up circuit for the relay $I^4$ to cause that relay to be dropped away and to connect ground to respective control circuits selected by the relay $1CHP^4$ for selecting a combination of tone generators to have their outputs rendered effective to modulate the next pulse to be radiated by the antenna A4. Inasmuch as the change may occur during the transmission of a pulse, it is desirable rather than to modulate the remaining portion of that pulse according to the indication code, that the transmission of the indication be delayed until that pulse is terminated. It is therefore provided that the relay $I^4$ is maintained picked up by a stick circuit extending from (+) including front contact 81 of relay FP and front contact 82 of relay $I^4$ so as to prevent the dropping away of that relay during the transmission of a pulse from field station No. 4. However, at the end of the pulse, this stick circuit is opened by the dropping away of the relay FP, and the relay $I^4$ thus becomes dropped away to close its back contact 83 and condition the circuit for the selection of tones for transmission during the next pulse.

With reference to Fig. 10, it is illustrated in the tone chart of that figure that the tones 5, 6 and 8 are simultaneously transmitted during the transmission of an indication pulse for indicating a signal clear for governing traffic to the right. In addition to transmitting these tones, the tone No. 3 is applied to the pulse as has been described for calling the station No. 3, and in addition the tone No. 4 is applied to the pulse as the registration tone for the field station transmitting the indications so that when such tones are relayed through to the control office, to identify the particular field station that is transmitting the indications.

It is therefore provided that the tone generator No. 3 is rendered effective to modulate the pulse radiated by the antenna A4 in a manner which has been described for the purpose of calling the next field station nearer to the control office; the output of tone generator No. 4 is rendered effective in accordance with the dropping away of the relay $I^4$ to modulate the indication pulse radiated by the antenna A4 by the connection of ground to shunt the negative bias of the control tube (not shown) associated with that tone generator through contact 28 of oscillator $180CT^4$ in its lower position, front contact 29 of relay FP and back contact 83 of relay $I^4$; the output of tone generator No. 5 is rendered effective to modulate the indication pulse radiated by the antenna A4 by reason of relay $1CHP^4$ being dropped away to connect ground to the control tube associated with that tone generator through contact 28 of oscillator $180CT^4$ in its lower position, front contact 29 of relay FP, back contact 83 of relay $I^4$, and back contact 84 of relay $1CHP^4$, the output of the tone generator No. 6 is rendered effective in a similar manner for modulation of the indication pulse through back contact 85 of relay $1CHP^4$; and the output of the tone generator No. 8 is rendered effective to modulate the indication pulse in accordance with the shunting of the negative bias of its associated control tube by the connection of ground through contact 28 of oscillator $180CT^4$ in its lower position, front contact 29 of relay FP, back contact 83 of relay $I^4$, back contact 86 of relay $1CHP^4$ and back contact 87 of relay $RM^4$.

During the transmission of the indication pulse, the relay $1CH^4$ which has initiated the transmission of the indication is restored to its picked up position by a pick up circuit extending from (+) including contact 26 of oscillator $180CT^4$ in its lower position, front contact 88 of relay FP, back contact 89 of relay $I^4$, back contact 90 of $1CHP^4$, winding of relay $1CH^4$, front contact 16 of relay $LM^4$, back contact 17 of relay $RM^4$, and back contact 12 of the recheck control relay $RC^4$, to (−). It will be noted that this pick up circuit is closed only for a short time (corresponding to the duration of the indication pulse transmitted from field station No. 4), such time being determined by the dropping away time of the relay FP. It is thus desirable that the relay FP be sufficiently slow in dropping away to permit the picking up of the relay $1CH^4$ after the circuit for the relay FP has been opened by the shifting of oscillator contact 26 to its lower position. The other consideration in accordance with the timing of the relay FP is that it must be made sufficiently slow in dropping away to provide the desired duration of each indication pulse that is transmitted from the field station No. 4. After the relay $1CH^4$ has been restored to its picked up position, it is maintained picked up by its stick circuit which has been heretofore described.

After the relay FP has become dropped away to terminate the pulse transmitted from field station No. 4, the closure of its back contact 88 closes a pick up circuit for the change repeater relay $1CHP^4$ to provide for the restoration of that relay. This circuit extends from (+) including contact 26 of oscillator $180CT^4$ in its lower position, back contact 88 of relay FP, half-wave rectifier 91, front contact 80 of relay $1CH^4$, and winding of relay $1CHP^4$, to (−). The picking up of this relay, by the closure of its front contact 92 establishes a stick circuit to maintain the relay $1CHP^4$ steadily picked up, dependent upon the change relay $1CH^4$. It will be noted that the shifting of contact 90 upon the picking up of relay $1CHP^4$ provides that the relay $1CH^4$ will not have its pick up circuit energized during subsequent "on" periods of transmission, and thus will subsequently be at all times subject to dropping away as a result of the opening of its stick circuit.

After the relay $1CHP^4$ is picked up, assuming there are no other relays $CHP^4$ dropped away for the transmission of other indications, a pick up circuit is closed for the indication control relay $I^4$ upon the closure of front contact 25 of relay 1CHP$^4$, and the picking up of that relay is effective by the opening of back contact 83 to prevent the modulation of the next "on" period carrier pulse that is transmitted.

In a similar manner indication pulses relative to the condition of the track switch at field station No. 4 are transmitted in accordance with the positioning of the switch correspondence repeater relays NWC and RWC which are used to repeat the respective normal and reverse correspondence conditions of the track switch at field station No. 4, such relays being controlled in a manner well known to those skilled in the art. Any change in the position of either of such relays is effective to interrupt the stick circuit of the change relay 2CH$^4$ in a manner comparable to that which has been specifically described for the interruption of the circuit for the relay 1CH$^4$ by the relay RM$^4$. The relay 2CHP$^4$ is dropped away by the opening of its stick and pick up circuits at front contacts 21 and 93 respectively of relay 2CH$^4$, and upon the dropping away of relay 2CHP$^4$, the opening of front contact 24 is effective to cause the dropping away of the indication control relay $I^4$ to render the outputs of the respective tone generators effective to modulate the next pulse as an indication pulse with tones selected according to the contacts 94 and 95 of the relays NWC$^4$ and RWC$^4$ respectively and the back contacts 96, 97, and 98 of relay 2CHP$^4$. The particular tones selected for modulation of the indication pulse correspond with the tone chart of Fig. 10 wherein the transmission of tones 5, 7 and 8 is an indication of the switch being locked and is transmitted when either front contact 95 of relay RWC$^4$ or front contact 94 of relay NWC$^4$ is closed. If both of these contacts are open, the tones 5, 7 and 9 are transmitted so as to distinctively indicate at the control office that the track switch is unlocked and/or out of correspondence.

The modulation of the indication pulse under consideration by the output of tone generators Nos. 3 and 4 is rendered effective in a manner which has been described, and the transmission of tones 5, and 7 during that pulse is rendered effective in accordance with the connection of ground to shunt the negative bias of the control tubes (not shown) associated with the respective tone generators Nos. 5 and 7. The ground connection for shunting the negative bias of the control tube (not shown) associated with tone generator No. 5 includes contact 28 of oscillator 180CT$^4$ in its lower position front contact 29 of relay FP, back contact 83 of relay $I^4$, front contact 84 of relay 1CHP$^4$ and back contact 96 of relay 2CHP$^4$. In a similar manner the shunting of the grid bias of the control tube associated with tone generator No. 7 is accomplished by the connection of ground through contact 28 of oscillator 180CT$^4$ in its lower position, front contact 29 of relay FP, back contact 83 of relay $I^4$, front contact 85 of relay 1CHP$^4$ and back contact 97 of relay 2CHP$^4$. The tones Nos. 8 or 9 are selected so that the negative bias of the control tube (not shown) associated with tone generator No. 8 is shunted by the connection of ground through contact 28 of oscillator 180CT$^4$ in its lower position, front contact 29 of relay FP, back contact 83 of relay $I^4$, front contact 86 of relay 1CHP$^4$, back contact 98 of relay 2CHP$^4$, and front contact 95 of relay RWC$^4$ (if relay RWC$^4$ is picked up) or back contact 95 of relay RWC$^4$, and front contact 94 of relay NWC$^4$ (if relay NWC$^4$ is picked up). In case the relays NWC$^4$ and RWC$^4$ are both dropped away, the negative bias of the control tube (not shown) associated with the tone generator No. 9 is shunted by the ground connection including contact 28 of the oscillator 180CT$^4$ in its lower position, front contact 29 of relay FP, back contact 83 of relay $I^4$, front contact 86 of relay 1CHP$^4$, back contact 98 of relay 2CHP$^4$, back contact 95 of relay RWC$^4$ and back contact 94 of relay NWC$^4$.

The restoration of the relay 2CH$^4$ during the transmission of the indication pulse is accomplished in a manner comparable to the restoration of the relay 1CH$^4$, the pick up circuit for relay 2CH$^4$ extending through front contact 90 of relay 1CHP$^4$ so as to establish a chain circuit system of priority whereby the relays CH$^4$ are restored one at a time, that is, one after each indication pulse, in the order according to their positions in the chain circuit and in numerical order as indicated by the preceding numerals of the reference characters used for designation of these change relays. More specifically, if the relays 1CH$^4$ and 2CH$^4$ are both dropped away at the same time, the indications associated with the relay 1CH$^4$ will be transmitted during the first pulse, and the relay 1CH$^4$ will be picked up during that pulse, but because the relay 1CHP$^4$ cannot be picked up until the relay FP is dropped away to terminate the pulse that is being transmitted and open the pick up circuits for the relays CH$^4$ at front contact 88.

The relays 3CH$^4$ and 3CHP$^4$ are associated with the communication of track indications to the control office from field station No. 4 as selected by the track relay TR$^4$. It is thus provided that the shifting of contact 11 of the track relay TR$^4$ in the stick circuit for the change relay 3CH$^4$ is effective to initiate the transmission of a track indication. The back contacts 99, 100, and 101 of the relay 3CHP$^4$ are effective to select tones 6, 7 and 8 for transmission if the track is unoccupied in accordance with the closure of front contact 102 of the track relay TR$^4$, or the tones 6, 7 and 9 if the track is occupied as selected by the closure of the back contact 102 of relay TR$^4$.

In case it is desired to have a recheck of all of the indications at the field station No. 4, a recheck control is transmitted from the control office in a manner corresponding to the mode of operation of the system for the transmission of recheck controls as it has been heretofore described. The transmission of such a control to field station No. 4 provides for the momentary picking up of the recheck relay RC$^4$, and the picking up of that relay, by the opening of back contact 12, interrupts the stick circuits for all of the relays CH$^4$ at field station No. 4, and thus provides that all of the relays CH$^4$ at field station No. 4 are dropped away. As a result of the dropping away of the relays CH$^4$, the relays CHP$^4$ are all dropped away, and the dropping away of the relay $I^4$ conditions the system for the transmission of the first indication pulse so that with the relay FP picked up the shifting of contact 28 of the oscillator 180CT$^4$ to its lower position provides for the transmission of indications as selected by the positions of the signal repeater relays LM$^4$ and RM$^4$ which are associated with the relay 1CHP$^4$. It will be noted that the relay $I^4$ is delayed in dropping away by its stick circuit including front contact 103 of relay RC$^4$ until the relay RC$^4$ is restored to its normal dropped away position; thus insuring that there will be only one recheck of the indications irrespective of how long the recheck button at the control office is maintained closed.

During the transmission of the signal indication pulse, the relay 1CH⁴ is restored and upon the dropping away of relay FP at the end of the pulse, the relay 1CHP⁴ is picked up, thus closing circuits at front contacts 84, 85 and 86 to condition the organization for the transmission of switch indications as selected by the contacts 94 and 95 of the relays NWC⁴ and RWC⁴ and the contacts 96, 97, and 98 of relay 2CHP⁴ which has been dropped away as a result of the recheck control. Similarly during the transmission of the switch indication pulse, the relay 2CH⁴ is picked up, and the relay 2CHP⁴ is picked up upon the closure of back contact 88 when relay FP is dropped away at the end of the pulse. Thus the third pulse is used for the transmission of track indications and the pulse is modulated according to selections by the contact 102 of the track relay TR⁴ and the back contacts 99, 100 and 101 of the relay 3CHP⁴. The relays 3CH⁴ and 3CHP⁴ are restored during and at the end of the track indication pulse respectively, and the picking up of relay 3CHP⁴ closes a circuit which has been described for the picking up of the relay I⁴ to thus restore the conditions of the indication transmitting apparatus after a complete recheck of the indications is accomplished.

If it were possible, for example, when the track indication pulse were being transmitted, for the relays 2CH⁴ and 2CHP⁴ to be dropped away, the opening of front contacts 96, 97 and 98 of the relay 2CHP⁴ would interrupt the circuits for selecting the tones transmitted for track indication, and change the combination of tones transmitted in accordance with selections for the transmission of switch indication. Obviously this mode of operation would be undesirable, and it is therefore provided that whenever the transmission of indications has been initiated by the dropping away of the relay I⁴, all relays CHP⁴ which remain picked up, are maintained energized by their stick circuits as long as the relay I⁴ is dropped away. Thus the relay 1CHP⁴ is maintained picked up by the closure of back contact 104 of relay I⁴, relay 2CHP⁴ is maintained picked up by back contact 105 of relay I⁴, and relay 3CHP⁴ is maintained picked up by back contact 106 of relay I⁴. It is therefore provided that although any change relay CH⁴ may be dropped away at any time, the associated relay CHP⁴ will be maintained picked up until indications which have been initiated by prior starts are communicated. When such communication is complete, the relay I⁴ is picked up, and by the picking up of such relay, all relays CHP⁴ are allowed to drop away that have their associated change relay CH⁴ dropped away.

*Relay of indications at intermediate station*

Having thus considered the manner in which indications are transmitted from field station No. 4, consideration will now be given as to the mode of operation at the intermediate field station No. 3 for the reception of the indications transmitted from field station No. 4, and the relaying of such indications from station to station to accomplish the transmission of indications from the most distant field station to the control office.

Upon considering the transmission of indications from field station No. 4, it has been pointed out that each indication pulse transmitted from that field station is modulated by tone No. 4 as the station registration tone for the field station transmitting the indications, and indication tones are selectively applied to the pulses in accordance with the indications to be communicated. These tones are all in addition to the tone No. 3 which is normaly transmitted from the field station No. 4 as a station call of the next field station toward the control office as has been specifically considered when describing the normal conditions of the system.

Thus with reference to Fig. 5, the reception of an indication pulse by the receiver F2 applies a plurality of tones simultaneously to the respective tone filters associated therewith in accordance with the tones used for modulation of the carrier wave transmitted from field station No. 4. It is provided that the relay 3R³ is picked up in a manner which has been described by its energization in the output circuit of the tone filter No. 3, and the closure of front contact 107 of that relay conditions the relays R³ for higher tone numbers so that they can be picked up, in series with the relay Y³, in accordance with the reception of their associated tones. It is therefore provided that because of the reception of tone No. 4, with relay 3R³ picked up, the relay 4R³ is picked up in the output circuit of tone filter No. 4. The circuit for relay 4R³ extends from (B+) and includes front contact 107 of relay 3R³, winding of relay Y³ and winding of relay 4R³. Energy is also applied to this circuit by front contact 108 of relay 3RP1 in response to the picking up of that relay, and because of the slow drop away characteristics of the relay 3RP1 as provided by the resistance 39 shunting the winding of that relay in series with the half-wave rectifier unit 40. It is thus provided that each of the relays for tones higher than tone No. 3 at field station No. 3, together with the relay Y³ is maintained picked up for a period of time subsequent to the termination of the pulse received, even though the relay 3R³ is dropped away immediately upon termination of the pulse received because of its energization by rectified alternating current in the anode-cathode circuit of the gas tube associated with the tone filter No. 3. In addition to the picking up of the relay 4R³ upon the reception of an indication pulse from field station No. 4, the relays 5R³, 6R³, 7R³, 8R³, and 9R³ are selectively governed in response to the particular indication tones received.

Because of the relay Y³ being picked up in response to the reception of an indication pulse, the relay 3RP2 is picked up as a repeater of relay 3R³ by the energization of a circuit extending from (+) including front contact 37 of relay SA³, front contact 38 of relay 3R³, winding of relay 3RP2 and front contact 110 of relay Y³, to (−). In response to the picking up of the relay 3RP2, the closure of front contact 111 causes the pick up of the repeater relay 3RP3. Upon the picking up of the relay 3RP3 the back contact 32 in the output circuit of the receiver F2 is opened to remove tone energy from the tone filters for a substantial period of time to prevent the possibility of the tone filters having their input circuit erroneously energized by tones transmitted from some intermediate station nearer the control office and within transmitting range of field station No. 3. The relay 3RP3 is preferably made substantially slow in dropping away by the resistor 112 in series with the half-wave rectifier 113 shunted across the winding of that relay so as to be maintained picked up during the relaying of the particular indication pulse under consideration through the next field station toward the control office.

Although it makes little difference whether or not the pulse received is terminated prior to the opening of the output circuit of the receiver F2 at field station No. 3 by the back contact 32 of relay 3RP3, it will be assumed that the opening of this circuit terminates the pulse as far as the control of the relays $R^3$ and $Y^3$ are concerned, and thus the relay $3R^3$ is dropped away in response to the opening of back contact 32 of relay 3RP3. The dropping away of relay $3R^3$ opens the circuit at front contact 107 by which the relays $R^3$ for higher tones have been picked up, but these relays are maintained picked up by the front contact 108 of relay 3RP1. Relay 3RP1 is deenergized upon the opening of its circuit at front contact 38 of relay $3R^3$, but it is made sufficiently slow by the resistor 39 and rectifier 40 to time the pulse to be transmitted.

Upon the dropping away of relay $3R^3$, the closure of its back contact 42 establishes a circuit by which the output of the tone generator No. 2 is rendered effective to modulate the transmitter F2 (see Fig. 5) for calling the next field station nearer to the control office. The transmitter F2 is rendered active at this time in accordance with the closure of front contact 41 of relay 3RP1 in series with back contact 76 of relay $3R^3$.

Because of there being no indications transmitted from the field station No. 3 on the pulse under consideration as being relayed through that field station, the tone generator No. 3 is not rendered effective to modulate the pulse transmitted because of the circuit connecting the control tube (not shown) for that tone generator to ground being open at back contact 114 of relay $Y^3$.

The output of the tone generator No. 4, however, at field station No. 3 is rendered effective to modulate the carrier wave pulse radiated from the antenna A6 because of the shunting of the grid bias of the control tube (not shown) associated with that generator by the connection of ground through front contact 44 of relay $SA^3$, back contact 42 of relay $3R^3$, front contact 43 of relay 3RP1, front contact 114 of relay $Y^3$ and front contact 115 of relay $4R^3$. It is thus provided that the station registration tone No. 4 for identifying field station No. 4 as being the station transmitting the indications on that pulse is relayed through station No. 3.

In a similar manner each of the relays $5R^3$, $6R^3$, $7R^3$, $8R^3$ and $9R^3$ that is picked up during the reception of an indication pulse from field station No. 4 provides for the connection of ground to shunt the negative bias of the grid of the control tube (not shown) associated with the tone generator at field station No. 3 that is provided for generating the tone number corresponding to the preceding numeral of the reference character of such relay $R^3$. It is therefore provided that the pulse radiated by the antenna A6 as a repeater pulse repeats all of the tones which have been received by the antenna A5 from field station No. 4 except for the station call number 3, and in addition the station call tone No. 2 is applied to the carrier wave radiated by the antenna A6 for calling the next field station toward the control office.

In a similar manner pulses received at field station No. 2 (see Fig. 4) from the next distant field station are relayed through field station No. 2, except for tone No. 2 which is the station call tone, and in addition to applying the tones that are received at that field station to the radiated carrier pulses, the control office station call tone No. 1 is applied to the carrier pulses so as to render the reception of these indications at the control office effective in a manner to be hereinafter described.

With reference to Fig. 4, the relay $2R^2$ is controlled in accordance with the output of the tone filter No. 2 in a manner comparable to that which has been specifically described for the control of the relay $3R^3$ by the tone filter No. 3 at station No. 3 as shown in Fig. 5. All of the relays $R^2$ at field station No. 2 having higher preceding numerals than the relay $2R^2$ are responsive to tone numbers received from field station No. 3 for both station registration and indication tones. Thus, if the relay $3R^2$ at field station No. 2 is picked up upon the reception of a pulse from field station No. 3, it signifies that the indication modulations applied to that pulse are for indications at field station No. 3, and similarly the picking up of the relay $4R^2$ at field station No. 2 signifies that the indication tones applied to that pulse have been applied by field station No. 4.

The relay $Y^2$ is picked up upon the reception of an indication pulse at field station No. 2 which is to be relayed through that station in accordance with the closure of front contact 116 of relay $2R^2$ and front contact 117 of relay 2RP1. The picking up of this relay, by the opening of back contacts 118, 119, 120 and 121 prevents the transmission on that pulse of any indications that may be stored for transmission at field station No. 2.

The output of the tone generator No. 1 is rendered effective during the radiation of the relay pulse to modulate the pulse because of the grid bias of the control tube (not shown) associated with that tone generator being shunted by the connection of ground through front contact 47 of relay $SA^2$, back contact 48 of relay $2R^2$ and front contact 49 of relay 2RP1.

It will be readily apparent that except for the organization of the apparatus at field station No. 2 being different from that specifically described for field station No. 3 as has been pointed out, the circuit organization at field station No. 2 corresponds to that which has been specifically described for the relaying of indication pulses through field station No. 3.

*Transmission of indications at intermediate stations*

The general mode of operation in the transmission of indications from the intermediate field stations is comparable to that which has been described for the transmission of indications from the end field station No. 4, except that the transmission of indications from an intermediate station must necessarily be delayed until a pulse is received having only the station call modulation for calling that station. This distinctive condition is set up in the control of the relay Y at each intermediate station, wherein such relay is picked up in response to the reception of indications from the next distant station but is maintained deenergized when the pulse that is received has only the station call modulations for calling that field station. For example, with reference to Fig. 5, the relay $Y^3$ is picked up upon the reception of a pulse transmitted from field station No. 4, only provided that such pulse is modulated by tone of a higher number than the tone No. 3 which is used as a station call tone for calling the intermediate station No. 3.

For consideration of a typical condition where indications are transmitted from an intermediate field station, it will be assumed that the relay $RM^3$ at field station No. 3 (see Fig. 5) is dropped away in accordance with the clearing of a signal at that field station for governing traffic to the right. Upon the shifting of contact 130 of that relay in the stick circuit for the relay $1CH^3$, the relay $1CH^3$ is dropped away, and it in turn causes the dropping away of the relay $1CHP^3$ according to a general mode of operation that has been heretofore described. The relay $I^3$ becomes dropped away, and the closure of its back contact 131 conditions a circuit whereby tone generators can be rendered effective as selected by the back contacts 132, 133, and 134 of relay $1CHP^3$ and by the back contact 135 of relay $RM^3$.

It is thus provided that with the relay $Y^3$ dropped away upon the dropping away of the relay $3R^3$ the control tube (not shown) associated with tone generator No. 5 is rendered conductive upon the shunting of its negative bias by the connection of ground through front contact 44 of relay $SA^3$, back contact 42 of relay $3R^3$, front contact 43 of relay 3RP1, back contact 131 of relay $I^3$, back contact 136 of relay $Y^3$, and back contact 132 of relay $1CHP^3$. In a similar manner the output of the tone generator No. 6 is rendered effective to modulate the carrier pulse radiated by the antenna A6 by the connection of ground through back contact 137 of relay $Y^3$ and back contact 133 of relay $1CHP^3$. Assuming the relay $RM^3$ to be dropped away, the output of the tone generator No. 8 is rendered effective to modulate the carrier pulse in accordance with the connection of ground through back contact 138 of relay $Y^3$, back contact 134 of relay $1CHP^3$, and back contact 135 of relay $RM^3$.

The relay 3RP2 is rendered active for the transmission of an indication pulse from field station No. 3 in accordance with the closure of back contact 139 of the relay $I^3$ which is dropped away only during the transmission of indications from field station No. 3, and in accordance with the picking up of this relay, with the relay $Y^3$ dropped away, the output of the tone generator No. 3 is rendered effective to modulate the carrier pulse as the station registration tone for field station No. 3. This is because of the connection of ground through front contact 44 of relay $SA^3$, back contact 42 of relay $3R^3$, front contact 43 of relay 3RP1, back contact 114 of relay $Y^3$, and front contact 140 of relay 3RP2.

Upon the dropping away of the relay $3R^3$ for the transmission of the indication pulse from field station No. 3, a restoration circuit is closed for the energization of the change relay $1CH^3$ extending from (+), including front contact 37 of relay $SA^3$, back contact 38 of relay $3R^3$, front contact 141 of relay 3RP1, back contact 142 of relay $I^3$, back contact 143 of relay $Y^3$, back contact 144 of relay $1CHP^3$, winding of relay $1CH^3$, contact 145 of relay $LM^3$, contact 130 of relay $RM^3$ and back contact 146 of relay $RC^3$, to (−). When the relay 3RP1 is dropped away to terminate the pulse being transmitted, the relay $1CHP^3$ is picked up by the energization of a circuit extending from (+), including front contact 37 of relay $SA^3$, back contact 38 of relay $3R^3$, back contact 141 of relay 3RP1, half-wave rectifier 147, front contact 148 of relay $1CH^3$, and winding of relay $1CHP^3$, to (−).

It will be noted from the circuit that has been described for the picking up of the relay $1CH^3$ that the inclusion of back contact 143 of relay $Y^3$ and back contact 142 of relay $I^3$ in such pick up circuit provides that the relay $1CH^3$ is picked up only subsequent to the transmission of an indication as to the position of the device with which it is associated, while the relay $1CH^3$ is non-responsive to pulses relayed through that field station having modulations applied by a more distant field station.

The front contact 114 of the relay $Y^3$ selects that energy is supplied through the respective contacts of the relays $4R^3$, $5R^3$, $6R^3$, $7R^3$, $8R^3$ and $9R^3$ to the control of the respective tone generators for tones corresponding to the preceding numerals of these relays only when indication modulations are received from the next distant field station, and thus these circuits are open when an indication pulse is transmitted from the intermediate station No. 3. This same contact selects when the relay $Y^3$ is dropped away that the station registration tone No. 3 is transmitted in case the relay 3RP2 is picked up because of indications being transmitted from the intermediate field station No. 3.

It will be noted that the relay I at each of the intermediate stations is maintained picked up by a stick circuit whenever a pulse is being relayed so that a start at that station cannot interrupt such transmission. This is accomplished by the circuit including front contact 122 of relay 3RP1 (see Fig. 5), for example.

Having thus described specifically the mode of operation at the intermediate field station No. 3 for the transmission of indications from that field station, it is to be understood that this mode of operation is typical of that provided for the communication of other indications from field station No. 3, and also for the communication of indications from other intermediate field stations such as from the field station No. 2 as illustrated in Fig. 4.

It will be noted in Fig. 4 that the relay $Y^2$ governs the transmission of indications from the field station No. 2 in the same manner as the relay $Y^3$ governs the transmission of indications from field station No. 3, and that the output of the tone generator No. 2 is rendered effective to modulate the carrier pulse during the transmission of indications from that field station as a registration tone in a manner comparable to that which has been fully described for rendering effective the modulation of the carrier pulse during the transmission of indications at field station No. 3 by the output of tone generator No. 3.

*Reception of indications at the control office*

With reference to Fig. 3, means is illustrated for controlling indicator lamps in accordance with the reception of pulses having distinctive modulations applied thereto from the field station No. 2. The indicator lamps are preferably disposed upon the control panel of the control machine at the control office.

The receiver F2 at the control office is tuned to the carrier frequency F2 which is used in the radio link system for the communication of indications. The receiver F2 comprises a circuit organization for demodulation of the tones which have been used in modulating the carrier wave which is received by the antenna A9. The demodulated output of the receiver F2 is applied as input to the respective tone filters, but such input to the tone filters can be effective to pick up the respective relays $R^1$ associated therewith only when tone No. 1 is received as the station call tone which is applied only by field station No. 2 for calling the control office. The output of tone filter No. 1 includes the lower winding of the relay $1R^1$, and the picking up of this relay in response to the station call for the control office is effective by the closure of front contact 59 to condition the relays $2R^1$, $3R^1$, $4R^1$, $5R^1$, $6R^1$, $7R^1$, $8R^1$ and $9R^1$ so that any of such relays can be picked up in accordance with the reception of the tones having numbers corresponding to their preceding numerals. The indication relays K which are of the magnetic-stick type according to the usual practice in the reception of indications in a CTC system, are conditioned in a decoding circuit network in accordance with the picking up of the relays $R^1$. According to the decoding circuits, distinctive combinations of 3 tones received are effective to distinctively control the respective magnetic-stick relays.

To consider, for example, the reception of some of the indications which have been specifically described as to their transmission from the respective field stations, it will be assumed that an indication is transmitted from field station No. 4 indicating that a signal has been cleared for governing traffic to the right. This has been described as being accomplished by the modulation of the carrier pulse by the tones 4, 5, 6 and 8, in addition to the station call tone for the next field station nearer to the control office. Also the station call tones vary in relaying the indications from station to station, but the tones 4, 5, 6 and 8 are eventually received at the control office in addition to the station call tone No. 1 for such office, and thus with the relay $1R^1$ picked up in response to the call of the control office the relays $4R^1$, $5R^1$, $6R^1$ and $8R^1$ are picked up in the output circuits of the respective tone filters Nos. 4, 5, 6 and 8.

As a result of the picking up of these relays, a decoding circuit is closed for the energization of the relay $RMK^4$ extending from the positive terminal of the center tap battery 153, including front contact 149 of relay $8R^1$, front contact 150 of relay $6R^1$, front contact 151 of relay $5R^1$, front contact 152 of relay $4R^1$, winding of relay $4MK^4$ and winding of relay 4ST, to the center tap connection of the battery 153. By the inclusion of the winding of the neutral station relay 4ST in this circuit, the relay 4ST is picked up for the duration of the pulse received to momentarily energize the indicator lamp 4SK and thus indicate to the operator of the control machine that an indication is received from the field station No. 4. The energization of the relay $RMK^4$ with the polarity applied by the circuit just described actuates the contacts of this relay to their picked up positions and thus provides means for energization of a signal indicator lamp for indicating that the signal governing traffic to the right at field station No. 4 has been cleared. For the purpose of simplification of the drawings this indicator lamp is not shown as the circuit organization for controlling the indicator lamp $LME^4$, which is provided for indicating the clearing of a signal for governing traffic to the left at field station No. 4, can be considered as a typical organization including front contact 154 of relay $LMK^4$ for controlling indicator lamps associated with other relays. In other words, each of the magnetic-stick relays K is to be assumed as having an associated indicator lamp controlled by a front contact of that relay, the front contact being closed in response to the energization of that relay with a positive polarity, and such contact being opened by the energization of that relay with a negative polarity.

Assuming that the signal which has been considered as being cleared at field station No. 4 for governing traffic to the right, is restored to stop, as by the passage of a train, the stop indicator code comprising the tones 4, 5, 6 and 9 is transmitted, and upon the reception of such combination of tones at the control office, the relay $RMK^4$ is energized with a negative polarity for actuation of its contacts to their dropped away positions by a circuit extending from the negative terminal of the battery 153 through front contact 155 of relay $9R^1$, back contact 149 of relay $8R^1$, front contact 150 of relay $6R^1$, front contact 151 of relay $5R^1$, front contact 152 of relay $4R^1$, winding of relay $RMK^4$ and winding of relay 4ST to the center tap connection of the battery 153. Such energization provides for the extinguishing of the indicator lamp (not shown) which is governed by the relay $RMK^4$. It will be noted that this combination of tones is also used for restoration of the magnetic stick relay $LMK^4$ which is associated with indicating signals governing traffic to the left; but the relay $LMK^4$ is already assumed to be dropped away and to thus maintain the circuit for the associated indicator lamp $LME^4$ open at front contact 154. The circuit by which the relay $LMK^4$ is energized under such conditions extends from the negative terminal of the battery 153, including front contact 156 of relay $9R^1$, back contact 157 of relay $7R^1$, front contact 158 of relay $6R^1$, front contact 159 of relay $5R^1$, front contact 160 of relay $4R^1$, winding of relay $LMK^4$ and winding of relay 4ST to the center tap of the battery 153. If there is an indication code received for the clearing of a signal governing traffic to the left, the relay $LMK^4$ is picked up by the energization of a circuit similar to that just described except that the positive polarity is used for energization of the circuit, and energy is applied at front contact 157 of relay $7R^1$ instead of front contact 156 of relay $9R^1$.

Having thus described the manner in which indications as to the clear and stop conditions of the signals at a particular field station are received, it is to be understood that this organization is typical of that provided for indicating the condition of the signals at each of the other field stations, and thus the relays $RMK^3$, $LMK^3$ and $RMK^2$ and $LMK^2$ are controlled in accordance with the reception of signal indication tones together with station registration tones assigned to the field station numbers corresponding to the respective exponents of these relays. The relay $LMK^3$ is therefore responsive to signal indications only when front contact 161 of the relay $3R^1$ is closed, and the relay $LMK^2$ is responsive to a signal indication code only when front contact 162 of relay $2R^1$ is closed.

If a switch locked indication is transmitted from field station No. 4, the tones 4, 5, 7 and 8 are received, and the picking up of relays $4R^1$, $5R^1$, $7R^1$ and $8R^1$ conditions a circuit for the positive energization of the relay $WK^4$ extending from the positive terminal of the center tap battery 153 including front contact 163 of relay $8R^1$, front contact 164 of relay $7R^1$, front contact 165 of relay $5R^1$, front contact 166 of relay $4R^1$, winding of relay $WK^4$ and winding of relay 4ST, to the center tap connection of the battery 153.

In case the indication is that the switch is unlocked, the code comprising tones 4, 5, 7 and 9 is received, and such code provides for the energization of the relay $WK^4$ with negative polarity for the actuation of its contacts to their dropped away positions. Such energization is provided by a circuit extending from the negative terminal of the center tap battery 153, including front contact 167 of relay $9R^1$, back contact 163 of relay $8R^1$, front contact 164 of relay $7R^1$, front contact 165 of relay $5R^1$, front contact 166 of relay $4R^1$, winding of relay $WK^4$ and winding of relay 4ST, to the center tap of the battery 153. It will be readily apparent that the circuit organization is such as to provide for a similar mode of operation in the control of the relays $WK^3$ and $WK^2$ which are associated with receiving indications from field stations Nos. 3 and 2 respectively as to the condition of the track switch at each of these stations. The relay $WK^3$ is controlled in accordance with the reception of station registration tone No. 3, through the front contact 168 of relay $3R^1$; and similarly the relay $WK^2$ is controlled through front contact 169 of the relay $2R^1$ in response to the station registration tone No. 2 transmitted from field station No. 2.

In accordance with the reception of an indication at the control office that the OS track section at field station No. 4 is unoccupied, the track indication relay $TK^4$ is picked up in accordance with the reception of tones 4, 6, 7 and 8 by the energization of a circuit extending from the positive terminal of the battery 153 including front contact 170 of relay $8R^1$, front contact 171 of relay $7R^1$, front contact 172 of relay $6R^1$, front contact 173 of relay $4R^1$, winding of relay $TK^4$ and winding of relay 4ST, to the center tap of the battery 153. When an indication is received that the track is occupied, the tones 4, 6, 7 and 9 are used to modulate the carrier wave, and thus the relay $TK^4$ is dropped away because of negative energization by a circuit extending from the negative terminal of the battery 153 including front contact 174 of relay $9R^1$, back contact 170 of relay $8R^1$, front contact 171 of relay $7R^1$, front contact 172 of relay $6R^1$, front contact 173 of relay $4R^1$, winding of relay $TK^4$ and winding of relay 4ST, to the center tap of the battery 153. In a similar manner each of the indication relays $TK^3$ and $TK^2$ is governed in accordance with tones transmitted from the field stations Nos. 3 and 2 respectively for track indication. The control of the relay $TK^3$ is rendered effective in accordance with the closure of front contact 175 of relay $3R^1$ and the control of relay $TK^2$ is rendered effective in accordance with the closure of front contact 176 of relay $2R^1$.

*Automatic sectionalization*

The link organization which has been described for the communication of indications to the control office is of course subject to failure because of dirty relay contacts, burned out electronic tubes, and the like, and inasmuch as the failure of the indication communication apparatus at any one field station would be effective in a link organization to render the entire communication of indications inoperative, it is desirable that means be provided at certain or all intermediate field stations whereby upon failure of that field station to receive pulses from the next more distant field station, that field station becomes effective as an end station to apply pulses at a uniform rate as timed by an oscillator 180CT. It is therefore provided that where such sectionalization is to be accomplished as is illustrated for both the intermediate stations Nos. 2 and 3, there is a standby oscillator 180 CT provided which is normally inactive, but which is rendered active upon cessation of pulses transmitted by the next distant field station.

At the field station No. 3 (see Fig. 5), the oscillator $180CT^3$ is normally inactive because of its circuit being opened at back contact 177 of relay $SA^3$, and because of relay $SA^3$ being maintained steadily picked up as has been described in response to the reception of pulses transmitted by field station No. 4. In case of failure to receive these pulses, the relay $SA^3$ is dropped away and, by the closure of back contact 177 it renders the oscillator $180CT^3$ active.

The shifting of contact 37 of relay $SA^3$ substitutes the oscillator contact 178 for the contact 38 of the relay $3R^3$ in governing the relays 3RP1, 3RP2 and 3RP3 and in governing the restoration of the relays $CH^3$ and $CHP^3$ so that a similar mode of operation is accomplished to that which has been described except that it is accomplished in accordance with the pulsing of the contact 178 of oscillator $180CT^3$, rather than in accordance with the pulsing of contact 38 of the relay $3R^3$.

In a similar manner the rendering active of the oscillator $180CT^3$ renders the oscillator contact 179 which is closed only in its lower position effective to govern the pulses transmitted by field station No. 3 rather than the back contact 42 of the relay $3R^3$. Because of the field station No. 3 becoming the end station under such conditions, the relay $Y^3$ is of course inactive at all times as there are no pulses to be relayed through that field station, and thus the transmission of indications from field station No. 3 can be accomplished by the modulation of any pulse formed by the oscillator $180CT^3$. The mode of operation at the intermediate field stations is of course the same as has been described, and each of these field stations which has a standby oscillator 180CT such as the field station No. 2 can also be effective to sectionalize the communication of indications in the case of a failure to receive pulses at that field station.

It will be readily apparent that the nature of the sectionalization organization is such that upon reestablishment of transmission at a more distant field station, the oscillator which has been transmitting at an intermediate field station is rendered inactive in response to the reception of pulses from the next distant field station because of picking up of the relay SA at the intermediate station whose oscillator has been active. More specifically, assuming the oscillator $180CT^3$ to have been rendered active as has been described at field station No. 3, the subsequent reception of pulses transmitted from field station No. 4 is effective by rendering the relay $3R^3$ active to cause the picking up of relay $SA^3$ and by the picking up of this relay, the shifting of its contacts 44 and 37 conditions the indication communication apparatus at the field station No. 3 to be active as an intermediate station rather than an end station. Upon this same principle the link communication system is put back together link by link from the station nearest the control office if several intermediate stations attempt to sectionalize at the same time. Thus the link communication system is automatically built up to include all successive stations, from the control office out, whose communication apparatus has not failed.

Although this embodiment of the present invention employs space radio from communication of the respective tones between the respective field stations and the control office, it is to be understood that other forms of communication of these tones may be employed, such as the tones being applied directly, or inductively, to line wires connecting the control office and the respective field stations, or the tones may be applied to a carrier of relatively low frequency which in turn is applied to line wires either by direct or inductive coupling. It is also to be understood that a coaxial cable can be used if desired for coupling the respective transmitters and receivers rather than using space radio communication.

Having thus described a centralized traffic control system as applied to the control of devices along a particular stretch of railway track as one embodiment of the present invention, it is desired to be understood that this form is selected for the purpose of simplifying the disclosure of the invention rather than to limit the number of forms which the invention may assume, and it is to be further understood that various adaptations, alterations, and modifications may be applied to the specific form shown to meet the requirements of practice without in any manner departing from the spirit or scope of the present invention except as limited by the appending claims.

What I claim is:

1. In a centralized traffic control system for communicating indications from a plurality of field stations to a control office, transmitting means at the station most distant from the control office normally effective to transmit station call modulation pulses intermittently, the modulation tone transmitted being that assigned for calling the next station toward the control office, link repeater transmitting and receiving apparatus at each of the intermediate field stations, said link receiving apparatus being distinctively responsive to all tones received only when one of such tones is a station call tone assigned for calling that station, said link transmitting apparatus being effective to transmit modulation pulses in response to the pulses received, one modulation tone transmitted being a distinctive modulation station call tone assigned to the next station nearer the control office, irrespective of whether or not indications are to be transmitted from that field station, and indication transmitting means at each of the field stations effective to distinctively modulate a pulse transmitted by said transmitting apparatus in accordance with the condition of a device at that station.

2. In a centralized traffic control system for the communication by space radiation at a single carrier frequency of indications from a plurality of field stations to a control office, transmitting means at the station most distant from the control office effective to radiate modulated carrier station call pulses at regular intervals, the modulation tone applied being that assigned for calling the next station toward the control office, link repeater transmitting and receiving apparatus at each of the intermediate field stations, said link receiving apparatus being distinctively responsive to all tones received at that station only when one of such tones is a station call tone assigned for calling that station, said link transmitting apparatus being effective to radiate a carrier pulse in response to each pulse received bearing the station call tone for that station, and said link transmitter being effective to modulate the carrier pulse transmitted in accordance with the indication communication modulations of the last carrier pulse received from the next distant field station, and indication transmitting means at each of the field stations effective to distinctively modulate a carrier pulse radiated by the transmitter at that station.

3. In a centralized traffic control system for communicating indications from a plurality of field stations to a control office, pulse transmitting apparatus at the most distant field station normally active to transmit pulses modulated by a distinctive station call tone assigned to call the next field station toward the control office, link communication transmitting and receiving apparatus at each of the intermediate field stations, said link receiving apparatus being distinctively responsive to modulations of a pulse transmitted from the next distant field station, and said link receiving apparatus comprising electro-responsive means energized in response to modulation tones received from the next distant field station except for the station call tone assigned to that field station, and said link transmitting apparatus being effective to transmit a pulse modulated by a distinctive tone calling the next station toward the control office in response to each pulse received from the next distant field station, and indication transmitting means at each of the field stations effective in response to a change in a device to be indicated to distinctively modulate a pulse transmitted from that station, said indication transmitting means being regulated by said electro-responsive means so as to permit indication modulations to be applied to the pulse transmitted from that field station only provided that said electro-responsive means is energized.

4. In a centralized traffic control system of the character described for communicating indications from a plurality of field stations to a control office, pulse transmitting apparatus at the most distant field station normally active to transmit pulses modulated by a distinctive station call tone assigned to call the next field station toward the control office, link communication transmitting and receiving apparatus at each of the intermediate field stations, said link receiving apparatus being distinctively responsive to modulations of a pulse transmitted from the next distant field station, and said link transmitting apparatus being effective to transmit a pulse modulated by a distinctive tone calling the next station toward the control office in response to each pulse received from the next distant field station, and indication transmitting means at each of the field stations effective in response to a change in a device to be indicated to distinctively modulate a pulse transmitted from that field station, said indication transmitting means being effective to modulate a pulse transmitted by an intermediate station only provided that the last pulse received from the next distant station is modulated only by the station call tone.

5. In a centralized traffic control system wherein indications are communicated by space radiation at a single carrier frequency from a plurality of field stations to a control office, pulse transmitting apparatus at the most distant field station normally active to radiate a carrier wave having modulation pulses intermittently applied thereto at a distinctive call tone assigned to call the next field station toward the control office, link communication transmitting and receiving apparatus at each of the field stations, said link receiving apparatus being distinctively responsive to tones transmitted from the next distant field station, and said link transmitting apparatus being effective to transmit a carrier pulse modulated by a distinctive tone calling the next station toward the control office in response to each pulse received from the next distant field station, and indication transmitting means at each of the field stations effective in response to a change in a device to be indicated to distinctively modulate a carrier pulse radiated from that field station, said indication transmitting means being rendered effective to modulate the carrier at an intermediate field station only provided that the last pulse received from the next distant station is modulated only by a station call tone.

6. A centralized traffic control system wherein indications are communicated from a plurality of field stations to a control office by carrier pulses comprising in combination, a normally active pulse transmitter at the most distant station effective to transmit carrier pulses at a predetermined rate, a link transmitter at each intermediate station between the control office and said most distant station effective to transmit a carrier pulse when rendered active, modulation means at each of the field stations for distinctively modulating each pulse transmitted from that station in accordance with a distinctive modulation frequency assigned to call the next field station nearer the control office, pulse receiving means at each of the intermediate field stations distinctively responsive to a particular distinctive modulation frequency assigned as a station call frequency for that station, said pulse receiving means being effective to render said link transmitter active for the transmission of a pulse in response to each pulse received, only provided that the pulse received is modulated by said distinctive modulation frequency assigned to that station.

7. A centralized traffic control system for communicating indications from a plurality of field stations to a control office comprising in combination, a pulse transmitter at the most distant station normally active to transmit modulated pulses distinctively characterized for calling the next field station toward the control office, a link transmitter at each intermediate station between said most distant station and the control office effective when rendered active to transmit a modulated pulse of a selected character, pulse receiving means at each of the intermediate stations distinctively responsive to the particular distinctive modulation frequency assigned as a station call frequency for that station, said pulse receiving means being effective to render said link transmitter active for the transmission of a modulated pulse in response to each pulse received, only provided that the pulse received is modulated by said distinctive modulation frequency assigned to that station.

8. A centralized traffic control system for transmitting indications to a control office from each of a plurality of field stations comprising in combination, a code oscillator at the most distant field station normally active to form pulses at a predetermined rate, a pulse transmitter at the most distant field station effective to transmit a pulse for each pulse formed by said code oscillator, a link transmitter at each intermediate station between the control office and said most distant station effective to transmit a pulse when rendered active, said pulse being distinctively modulated, pulse receiving means at each of the intermediate field stations responsive to each pulse received only provided that such pulse bears a particular station call modulation characteristic of the call for that particular station, said pulse receiving means when responsive being effective to render said pulse transmitter active at that station.

FRANK X. REES.

REFERENCES CITED

The following references are of record in the file of this patent:

UNITED STATES PATENTS

| Number | Name | Date |
|---|---|---|
| 1,852,404 | Delong | Apr. 5, 1932 |
| 2,068,906 | Bushnell | Jan. 26, 1937 |
| 2,393,377 | Jackel | Jan. 22, 1946 |
| 2,395,693 | Sorenson | Feb. 26, 1946 |
| 2,396,812 | Baughman | Mar. 19, 1946 |